US008905236B2

(12) United States Patent
Denome et al.

(10) Patent No.: US 8,905,236 B2
(45) Date of Patent: Dec. 9, 2014

(54) WATER-SOLUBLE FILM HAVING IMPROVED DISSOLUTION AND STRESS PROPERTIES, AND PACKETS MADE THEREFROM

(75) Inventors: Frank W. Denome, Cincinnati, OH (US); Steven G. Friedrich, Crown Point, IN (US); Regine Labeque, Brussels (BE); David M. Lee, Crown Point, IN (US); Roxane Rosmaninho, Auderghem (BE); Jichun Shi, Loveland, OH (US); Andrew P. Verrall, Crown Point, IN (US)

(73) Assignee: Monosol, LLC, Merrillville, IN (US)

( * ) Notice: Subject to any disclaimer, the term of this patent is extended or adjusted under 35 U.S.C. 154(b) by 781 days.

(21) Appl. No.: 13/016,621

(22) Filed: Jan. 28, 2011

(65) Prior Publication Data

US 2011/0186467 A1    Aug. 4, 2011

Related U.S. Application Data

(60) Provisional application No. 61/299,836, filed on Jan. 29, 2010, provisional application No. 61/299,834, filed on Jan. 29, 2010.

(51) Int. Cl.
*B65D 85/84*    (2006.01)
*C08J 5/18*    (2006.01)
*C11D 17/04*    (2006.01)
*C08L 29/04*    (2006.01)
*B65D 65/46*    (2006.01)

(52) U.S. Cl.
CPC .............. *C11D 17/042* (2013.01); *C08J 5/18* (2013.01); *C08J 2329/04* (2013.01); *C08L 2203/16* (2013.01); *C08L 29/04* (2013.01); *C08L 2205/025* (2013.01); *B65D 65/46* (2013.01)
USPC .................... 206/524.7; 428/35.2; 510/296

(58) Field of Classification Search
USPC ................... 206/524.1, 524.3, 524.6, 524.7; 428/35.2, 35.4, 35.5, 35.7, 34.1, 34.2; 510/295, 296, 220, 221, 108, 120
See application file for complete search history.

(56) References Cited

U.S. PATENT DOCUMENTS 2,220,099 A    11/1940   Guenther et al.
2,477,383 A    7/1949    Lewis
(Continued)

FOREIGN PATENT DOCUMENTS

EP    0 197 434 A2    10/1986
EP    0 197 434 B1    7/1989
(Continued)

OTHER PUBLICATIONS

International Search Report and Written Opinion for corresponding International application No. PCT/US11/22828, dated Mar. 25, 2011.

(Continued)

*Primary Examiner* — Jacob K Ackun
(74) *Attorney, Agent, or Firm* — Marshall, Gerstein & Borun LLP

(57) ABSTRACT

Disclosed is a pouch having at least one sealed compartment containing a first composition. At least one wall of the at least one sealed compartment is made from a water-soluble film having any suitable thickness. The water-soluble film comprises PVOH polymer such that when the film has a thickness of about 76 microns the film is characterized by a Dissolution Index of about 620 to about 920, or of about 665 to about 920, or about 710 to about 920; and a Stress Index of about 145 to about 626, or about 155 to about 480, or about 165 to about 325.

25 Claims, 2 Drawing Sheets

(56) References Cited

U.S. PATENT DOCUMENTS

| | | |
|---|---|---|
| 3,664,961 A | 5/1972 | Norris |
| 3,919,678 A | 11/1975 | Penfold |
| 3,929,678 A | 12/1975 | Laughlin et al. |
| 3,975,280 A | 8/1976 | Hachmann et al. |
| 4,000,093 A | 12/1976 | Nicol et al. |
| 4,075,116 A | 2/1978 | Mesaros |
| 4,119,604 A | 10/1978 | Wysong |
| 4,155,971 A | 5/1979 | Wysong |
| 4,156,047 A | 5/1979 | Wysong |
| 4,222,905 A | 9/1980 | Cockrell, Jr. |
| 4,239,659 A | 12/1980 | Murphy |
| 4,246,612 A | 1/1981 | Berry et al. |
| 4,259,217 A | 3/1981 | Murphy |
| 4,712,248 A | 12/1987 | Hongo |
| 4,713,248 A | 12/1987 | Kjornaes et al. |
| 4,810,410 A | 3/1989 | Diakun et al. |
| 4,828,744 A | 5/1989 | Kaufmann et al. |
| 5,114,611 A | 5/1992 | Van Kralingen et al. |
| 5,137,646 A | 8/1992 | Schmidt et al. |
| 5,227,084 A | 7/1993 | Martens et al. |
| 5,316,688 A | 5/1994 | Gladfelter et al. |
| 5,340,496 A | 8/1994 | Sato et al. |
| 5,576,281 A | 11/1996 | Bunch et al. |
| 6,599,871 B2 | 7/2003 | Smith |
| 6,632,869 B2 | 10/2003 | Weitzel |
| 6,787,512 B1 | 9/2004 | Verrall et al. |
| 6,995,125 B2 | 2/2006 | Dasque et al. |
| 7,229,955 B2 | 6/2007 | Dasque et al. |
| 7,304,023 B2 | 12/2007 | Dasque et al. |
| 7,727,946 B2 | 6/2010 | Catalfamo et al. |
| 2002/0161088 A1 | 10/2002 | Kochvar et al. |
| 2003/0060390 A1 | 3/2003 | Demeyere et al. |
| 2003/0108705 A1 | 6/2003 | Duffield et al. |
| 2003/0126282 A1 | 7/2003 | Sarkar et al. |
| 2003/0139312 A1 | 7/2003 | Caswell et al. |
| 2004/0065578 A1* | 4/2004 | Bone et al. .............. 206/524.1 |
| 2004/0204337 A1 | 10/2004 | Corona, III et al. |
| 2005/0001348 A1 | 1/2005 | Kohnen et al. |
| 2005/0061704 A1 | 3/2005 | Cole et al. |
| 2005/0183394 A1 | 8/2005 | Hammond et al. |
| 2005/0244444 A1 | 11/2005 | Kochvar et al. |
| 2005/0263428 A1* | 12/2005 | Duffield et al. ........... 206/524.7 |
| 2006/0172910 A1 | 8/2006 | Brooker et al. |
| 2006/0216424 A1 | 9/2006 | Maurer et al. |
| 2006/0293203 A1 | 12/2006 | De Dominicis et al. |
| 2007/0135561 A1 | 6/2007 | Rath et al. |
| 2007/0219111 A1 | 9/2007 | Ward et al. |
| 2007/0241022 A1 | 10/2007 | Denome et al. |
| 2007/0267316 A1* | 11/2007 | Ayats et al. .............. 206/524.7 |
| 2007/0267317 A1 | 11/2007 | Van der Schaaf et al. |
| 2007/0269651 A1 | 11/2007 | Denome et al. |
| 2008/0020220 A1 | 1/2008 | Maurer et al. |
| 2008/0146481 A1 | 6/2008 | Brown et al. |
| 2009/0123679 A1 | 5/2009 | Denome et al. |
| 2011/0023240 A1 | 2/2011 | Fossum et al. |
| 2011/0188784 A1 | 8/2011 | Denome et al. |

FOREIGN PATENT DOCUMENTS

| | | |
|---|---|---|
| EP | 0 414 549 B1 | 12/1994 |
| FR | 2 743 567 A1 | 7/1997 |
| GB | 1137741 | 12/1968 |
| GB | 1 466 799 | 3/1977 |
| GB | 2 393 968 A | 4/2004 |
| JP | 2003-206380 A | 7/2003 |
| WO | WO-92/01037 A1 | 1/1992 |
| WO | WO-94/22800 | 10/1994 |
| WO | WO-02/16205 | 2/2002 |
| WO | WO-2004/003127 A1 | 1/2004 |
| WO | WO-2009/098659 | 8/2009 |
| WO | WO-2009/152031 | 12/2009 |
| WO | WO-2010/141301 | 12/2010 |

OTHER PUBLICATIONS

Clariant GmbH; Mowiol Polyvinyl Manual; Dec. 31, 1999, pate 105PP; retreived from the Internet: URL:http://www2.cbm.uam.es/confocal/manuales/mowiol.pdf (Retreived on Sep. 23, 2011) pp. B10, C4, E1-E4, G11.

International Search Report and Written Opinion for corresponding International application No. PCT/US11/22825, dated Mar. 25, 2011.

International Search Report and Written Opinion for corresponding International application No. PCT/US2011/22828, mailed Mar. 25, 2011.

International Search Report and Written Opinion for corresponding International application No. PCT/US2011/023180, mailed Apr. 29, 2011.

International Search Report and Written Opinion for corresponding International application No. PCT/US2011/023176, mailed May 6, 2011.

Office Action for Australian Application No. 2011210549, dated Aug. 30, 2013.

Office Action for Canadian Application No. 2,786,739, dated May 22, 2013.

Office Action for Chinese Application No. 201180007511.0, dated Nov. 26, 2013.

Office Action for Chinese Application No. 201180007542.6, dated Apr. 16, 2013.

Office Action for Japanese Application No. 2012-551370, dated Jul. 30, 2013.

Search Report for Chinese Application No. 201180007542.6.

* cited by examiner

WATER-SOLUBLE FILM HAVING IMPROVED DISSOLUTION AND STRESS PROPERTIES, AND PACKETS MADE THEREFROM

CROSS REFERENCE TO RELATED APPLICATION

The benefit of the priority to U.S. Provisional Patent Applications 61/299,836 and 61/299,834, both filed on 29 Jan., 2010, is claimed and each is incorporated herein by reference in its entirety.

FIELD

This disclosure generally relates to water-soluble films and pouches comprising water-soluble films. More particularly, the disclosure relates to water-soluble films and pouches comprising water-soluble films having desired characteristics including good cold water-solubility, wet hand moisture resistance and mechanical properties.

BACKGROUND

Water-soluble polymeric films are commonly used as packaging materials to simplify dispersing, pouring, dissolving and dosing of a material to be delivered. For example, pouches made from water-soluble film are commonly used to package household care compositions such as laundry or dish detergent. A consumer can directly add the pouched composition to a mixing vessel, such as a bucket, sink or washing machine. Advantageously, this provides for accurate dosing while eliminating the need for the consumer to measure the composition. The pouched composition may also reduce mess that would be associated with dispensing a similar composition from a vessel, such as pouring a liquid laundry detergent from a bottle. In sum, soluble pre-measured polymeric film pouches provide for convenience of consumer use in a variety of applications.

Some water-soluble polymeric films that are used to make currently marketed pouches may incompletely dissolve during the wash cycle, leaving film residue on items within the wash. Such problems may particularly arise when the pouch is used under stressed wash conditions, such as when the pouch is used in cold water, i.e. water at as low as 5° C. Notably, environmental concerns and energy cost are driving consumer desire for utilizing colder wash water.

Alternatively, water-soluble polymeric films that completely dissolve in cold water can be too sensitive to moisture and humidity to make pouches for the consumer market. For example, high humidity or water droplets from handling of the pouches with wet hands can cause the soluble pouches to stick together and/or dissolve through the packet film and cause leakage of pouch contents.

Pouches made from some films comprising polyvinyl alcohol polymers have addressed the aforementioned issues with some success. However, over the useful life of these pouches, the cold water solubility of some polyvinyl alcohol films may decrease when they are in contact with certain detergent compositions. Without being bound by theory, it is believed that the film becomes less soluble due to chemical interactions between the film and the composition inside the pouch. Consequently, as they age, these pouches may become incompletely dissolvable during a cold wash cycle, and may in turn leave film residue on items within the wash.

Pouches made from water-soluble films comprising polymers other than polyvinyl alcohol polymers may fail to successfully address each the aforementioned problems. For example, a polymeric film comprising starch and/or cellulosics may provide good wet hand moisture resistance. Yet, to achieve good cold water solubility, such a film may have to be so thin that its mechanical properties, including those relating to processability, are compromised. Moreover, films comprising starch and/or cellulosics are not nearly as readily processable given their relative lack of mechanical stretchability or elongation as compared to films of like thickness comprising polyvinyl alcohol polymers.

Thus, there remains a need for pouches comprising water-soluble films having the desired characteristics of good cold water-solubility even when aged, wet hand moisture resistance and mechanical properties including, but not limited to, good processability.

SUMMARY

The present disclosure provides a means of addressing each of the aforementioned problems by providing water-soluble films having a novel combination of characteristics. These characteristics are respectively quantified as follows.

Cold water-solubility is quantified as the Dissolution Time of a film. Dissolution Time is measured using the disclosed Slide Dissolution Test.

Wet Hand Moisture Resistance is quantified by the sensitivity of a film to moisture and humidity, i.e. the film's wet-handling characteristics. Wet Hand Moisture Resistance is measured using the Burst Strength Test set forth below.

These two physical characteristics are combined to provide the Dissolution Index of a film. Since each of these parameters relate to different aspects of a consumer's experience, i.e., pouch residue on washed clothing and pouches sticking together due to contact with wet hands, they are weighted differently in the equation utilized to Dissolution Index as defined in equation (1):

$$\text{Dissolution Index} = 7*(\text{Dissolution Time}) + (\text{Burst Strength}) \quad (1)$$

Mechanical properties of a film are quantified by its Stress at 100% Elongation and its Ultimate Tensile Strength. These quantities are measured utilizing the ASTM D 882, "Standard Test Method for Tensile Properties of Thin Plastic Sheeting".

These two film mechanical properties are combined to provide the Stress Index of a film as defined by the following equation (2):

$$\text{Stress Index} = (\text{Stress}@100\% \text{ Elongation})*(\text{Ultimate Tensile Strength}) \quad (2)$$

Without wishing to be bound by theory, it is believed that film having a Dissolution Index that is too high, i.e., above about 920, may provide for a pouch that incompletely dissolves during use. On the other hand, it is believed that a film having a Dissolution Index that is too low, i.e. less than about 620, may provide for a pouch that is too sensitive to moisture and humidity for the consumer market. Furthermore, it is believed that a film having a Stress Index that is too high, i.e., above about 626, may be difficult to process into a pouch due to difficulty in molding into a cavity. On the other hand, it is believed that a film having a Stress Index that is too low, i.e., less than about 145, may be susceptible to pinhole formation during processing into a pouch.

Pouches according to the present disclosure have at least one sealed compartment containing a first composition, wherein at least one wall of the at least one sealed compartment is made from a water-soluble film having any suitable thickness, the water-soluble film comprising one or more polyvinyl alcohol (PVOH) polymers such that when the film has a thickness of about 76 microns (μm), it is characterized by: (a) a Dissolution Index of about 620 to about 920, or of about 665 to about 920, or about 710 to about 920; and (b) a Stress Index of about 145 to about 626, or about 155 to about 480, or about 165 to about 325.

BRIEF DESCRIPTION OF THE DRAWINGS

The present disclosure can be more readily understood with reference to the appended drawing figures where.

DETAILED DESCRIPTION

Definitions

Figure 3:
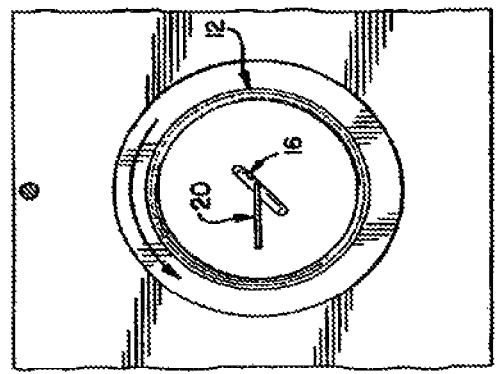
FIG. 3 is a top view of the test set-up of FIG. 2.

"Comprising" as used herein means that various components, ingredients or steps can that be conjointly employed in practicing the present disclosure. Accordingly, the term "comprising" encompasses the more restrictive terms "consisting essentially of" and "consisting of". The present compositions can comprise, consist essentially of, or consist of any of the required and optional elements disclosed herein.

"Aged" film as used herein means a film that has been exposed to (or in contact with) a liquid and/or powder composition over an extended period of time that represents a realistic consumer usage experience, i.e. from product manufacturing, transportation and storage in consumer homes until product usage. A method of "aging" film for testing purposes is described in detail below.

"Fresh" film as used herein means a film that has not been exposed to a liquid or powder composition for a typical consumer cleaning product. This film could have been exposed to ambient air moisture through typical film transportation and/or storage in manufacturing plants.

"Liquid" as used herein includes pastes, liquids, gels, foams and mousse. Non-limiting examples of liquids include: light duty and heavy duty liquid detergent compositions, fabric enhancers, hard surface cleaning compositions, detergent gels commonly used for laundry and dishwashing, bleach and laundry additives, shampoos, body washes, and other personal care compositions. Gases (e.g., suspended bubbles or solids, e.g., particles) can be included within the liquid.

"Solid" as used herein includes powders, agglomerates or mixtures thereof. Non-limiting examples of solids include: micro-capsules; beads; noodles; and pearlized balls. Solids, e.g., solid compositions, may provide a technical benefit including, but not limited to, through the wash benefits, pre-treatment benefits, and/or aesthetic effects.

"Fabric care benefit agent" as used herein means any material that can provide fabric care benefits such as fabric softening, color protection, pill/fuzz reduction, anti-abrasion, anti-wrinkle, and the like to garments and fabrics, particularly on cotton and cotton-rich garments and fabrics, when an adequate amount of the material is present on the garment/fabric. Non-limiting examples of fabric care benefit agents include cationic surfactants, silicones, polyolefin waxes, latexes, oily sugar derivatives, cationic polysaccharides, polyurethanes, fatty acids and mixtures thereof.

"Deposition aid" as used herein refers to any cationic polymer or combination of cationic polymers that significantly enhance the deposition of a fabric care benefit agent onto the fabric during laundering.

All percentages, parts and ratios are based upon the total dry weight of the film composition or total weight of the packet content composition of the present disclosure and all measurements made are at about 25° C., unless otherwise specified. All such weights as they pertain to listed ingredients are based on the active level and therefore do not include carriers or by-products that may be included in commercially available materials, unless otherwise specified.

All numerical ranges disclosed herein, are meant to encompass each individual number within the range and to encompass any combination of the disclosed upper and lower limits of the ranges.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm".

The pouches described herein comprise a water-soluble film. The water-soluble film, pouches comprising the water-soluble film, compositions contained with the pouches (i.e., "pouch compositions"), packaging for the pouches and processes of washing utilizing a pouch are described herein below.

As used herein, the terms packet(s) and pouch(es) should be considered interchangeable. In certain embodiments, the terms packet(s) and pouch(es), respectively, are used to refer to a container made using the film and a sealed container preferably having a material sealed therein, e.g., in the form a measured dose delivery system. The sealed pouches can be made from any suitable method, including such processes and features such as heat sealing, solvent welding, and adhesive sealing (e.g., with use of a water-soluble adhesive).

Water-Soluble Film

The pouches described herein comprise a water-soluble film. The water-soluble film comprises a total of about 50 wt % of a PVOH resin comprising one or more PVOH polymers. The film can have any suitable thickness such that when the film has a thickness of about 76 microns (μm), it is characterized by: (a) a Dissolution Index of about 620 to about 920, or of about 665 to about 920, or about 710 to about 920; and (b) a Stress Index of about 145 to about 626, or about 155 to about 480, or about 165 to about 325. The film can optionally have any one or more of the following characteristics:

The film described herein includes one or more polyvinyl alcohol (PVOH) polymers to make up the PVOH resin content of the film. One or a plurality of PVOH polymers can be selected or blended by the teachings herein to create an article, such as a film, which is soluble in aqueous solutions. High molecular weight PVOH polymers offer comparatively good residual moisture resistance but are poorly soluble and difficult to thermoform, in part due to thermal sensitivity of the PVOH polymer. Low molecular weight PVOH polymers offer good cold water solubility but are too reactive to residual moisture to function in a commercial or consumer setting, and are difficult to thermoform, in part, due to pinholing and subsequent seepage when filled with liquids or gels.

Polyvinyl alcohol is a synthetic resin generally prepared by the alcoholysis, usually termed hydrolysis or saponification, of polyvinyl acetate. Fully hydrolyzed PVOH, where virtually all the acetate groups have been converted to alcohol groups, is a strongly hydrogen-bonded, highly crystalline polymer which dissolves only in hot water—greater than about 140° F. (about 60° C.). If a sufficient number of acetate groups are allowed to remain after the hydrolysis of polyvinyl acetate, that is the PVOH polymer is partially hydrolyzed, then the polymer is more weakly hydrogen-bonded, less crystalline, and is generally soluble in cold waterless than about 50° F. (about 10° C.). As such, the partially hydrolyzed polymer is a vinyl alcohol-vinyl acetate copolymer, that is a PVOH copolymer. Thus, one or more partially hydrolyzed PVOH copolymers are used in the compositions described.

The total PVOH resin content of the film can have a degree of hydrolysis of at least 80%, 84% or 85% and at most about 92%, 90%, 89%, 88%, or 87%, for example in a range of about 84% to about 90%, or 85% to 88%, or 86.5%. As used herein, the degree of hydrolysis is expressed as a percentage of vinyl acetate units converted to vinyl alcohol units.

The viscosity of a PVOH polymer (μ) is determined by measuring a freshly made solution using a Brookfield LV type viscometer with UL adapter as described in British Standard EN ISO 15023-2:2006 Annex E Brookfield Test method. It is international practice to state the viscosity of 4% aqueous polyvinyl alcohol solutions at 20° C. All viscosities specified herein in Centipoise (cP) should be understood to refer to the viscosity of 4% aqueous polyvinyl alcohol solution at 20° C., unless specified otherwise. Similarly, when a resin is described as having (or not having) a particular viscosity, unless specified otherwise, it is intended that the specified viscosity is the average viscosity for the resin, which inherently has a corresponding molecular weight distribution. Depending on the PVOH resin the polydispersity index (PDI) of the resin may range from about 1.5 to about 5, or greater. The PDI of commercial PVOH polymers typically range from about 1.8 to about 2.3, and typical commercial PVOH polymers may have a PDI of as low as 1.7 and as high as 2.9. These commercial PVOH polymers are typically distinguished based on a specified, nominal viscosity and a specified degree of hydrolysis; for example MOWIOL 13-88 has a specified, nominal viscosity of 13 cP and a specified degree of hydrolysis of 88%.

The PVOH resin can have a viscosity average of at least about 13.5 cP, 14 cP, 15 cP, 16 cP, or 17 cP and at most about 20 cP, 19 cP, 18 cP, 17.5 cP, for example in a range of about 13.5 cP to about 20 cP, or about 14 cP to about 19 cP, or about 16 cP to about 18 cP, or about 17 cP to about 17.5 cP. It is well known in the art that the viscosity of PVOH resins is correlated with the weight average molecular weight ($\overline{M}w$) of the PVOH resin, and often the viscosity is used as a proxy for the $\overline{M}w$. Therefore, teachings in the present disclosure regarding the effect of changes in the viscosity of the PVOH resin on the performance or characteristics of the water-soluble films, disclosed herein, correspondingly, apply to the effects of changes in the $\overline{M}w$ of the PVOH resin on the same properties.

Commercially available PVOH resins typically have a polydispersity index (PDI) value of about 1.8 to about 2.2. The total PVOH resin content for use herein can have a PDI value of at least 1.3, 1.5, 1.8, 2, 2.5, 3, and at most 6, 5.5, 5, 4.5, 4, 3.5, for example in a range of about 1 to about 5, or about 2 to about 4.5, or about 2.5 to about 4.

Mixture of PVOH Polymers

The PVOH resin can include a mixture of PVOH polymers. For example, the PVOH resin can include at least two PVOH polymers, wherein as used herein the first PVOH polymer has a viscosity less than the second PVOH polymer. A first PVOH polymer can have a viscosity of at least about 8 cP, 10 cP, 12 cP, or 13 cP and at most about 40 cP, 20 cP, 15 cP, or 13 cP, for example in a range of about 8 cP to about 40 cP, or about 10 cP to about 20 cP, or about 10 cP to about 15 cP, or about 12 cP to about 14 cP, or 13 cP. Furthermore, a second PVOH polymer can have a viscosity of at least about 10 cP, 20 cP, or 22 cP and at most about 40 cP, 30 cP, 25 cP, or 24 cP, for example in a range of about 10 cP to about 40 cP, or 20 to about 30 cP, or about 20 to about 25 cP, or about 22 to about 24, or about 23 cP.

The individual PVOH polymers can have any suitable degree of hydrolysis, as long as the degree of hydrolysis of the total PVOH resin content is within the ranges described herein.

Optionally, the PVOH resin can, in addition or in the alternative, include a first PVOH polymer that has a $\overline{M}w$ in a range of about 50,000 to about 300,000 Daltons, or about 60,000 to about 150,000 Daltons; and a second PVOH polymer that has a $\overline{M}w$ in a range of about 60,000 to about 300,000 Daltons, or about 80,000 to about 250,000 Daltons;

The PVOH resin can still further include one or more additional PVOH polymers that have a viscosity in a range of about 10 to about 40 cP and a degree of hydrolysis in a range of about 84% to about 92%.

When the PVOH resin includes a first PVOH polymer having an average viscosity less than about 11 cP and a polydispersity index in a range of about 1.8 to about 2.3, then in one type of embodiment the PVOH resin contains less than about 30 wt. % of the first PVOH polymer. Similarly, the PVOH resin can contain less than about 30 wt. % of a PVOH polymer having a $\overline{M}w$ less than about 70,000 Daltons.

Of the total PVOH resin content in the film described herein, the PVOH resin can comprise about 10, 15, 20, 25, 30, 35, 40, 45, 50, 55, 60, 65, 70, 75, 80, 85, 90 wt. % of the first PVOH polymer, and about 10, 15, 20, 25, 30, 35, 40, 45, 50, 55, 60, 65, 70, 75, 80, 85, 90 wt. % of the second PVOH polymer, for example about 30 to about 85 wt. % of the first PVOH polymer, or about 45 to about 55 wt. % of the first PVOH polymer. For example, the PVOH resin can contain about 50 wt. % of each PVOH polymer, wherein the viscosity of the first PVOH polymer is about 13 cP and the viscosity of the second PVOH polymer is about 23 cP.

One type of embodiment is characterized by the PVOH resin including about 40 to about 85 wt. % of a first PVOH polymer that has a viscosity in a range of about 10 to about 15 cP and a degree of hydrolysis in a range of about 84% to about 92%. Another type of embodiment is characterized by the PVOH resin including about 45 to about 55 wt. % of the first PVOH polymer that has a viscosity in a range of about 10 to about 15 cP and a degree of hydrolysis in a range of about 84% to about 92%. The PVOH resin can include about 15 to about 60 wt. % of the second PVOH polymer that has a viscosity in a range of about 20 to about 25 cP and a degree of hydrolysis in a range of about 84% to about 92%. One contemplated class of embodiments is characterized by the PVOH resin including about 45 to about 55 wt. % of the second PVOH polymer.

When the PVOH resin includes a plurality of PVOH polymers the PDI value of the resin is greater than the PDI value of any individual, included PVOH polymer. Optionally, the PDI value of the PVOH resin is greater than 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.5, or 5.0.

Film Composition

The water-soluble film contains a total of at least about 50 wt. %, 55 wt. %, 60 wt. %, 65 wt. %, 70 wt. %, 75 wt. %, 80 wt. %, 85 wt. %, 90 wt. % of PVOH polymers.

In choosing the PVOH resin, it is desirable to choose a PVOH resin that has a PDI value greater than about 2, 2.2, 2.4, 2.6, 2.8, 3.0, 3.2, 3.4, 3.6, 3.8, 4.0, 4.2, 4.4, 4.6, 4.8, or 5.0; for example, the PDI value of the PVOH resin can be greater than the PDI value of any individual PVOH polymer included in the resin.

Furthermore, it is desirable to choose a PVOH resin that has a weighted-average degree of hydrolysis ($\overline{H}°$) between about 80 and about 92%, or between about 83 and about 90%, or about 85 and 89%. The $\overline{H}°$ is calculated by the formula $\overline{H}° = \Sigma(W_i \cdot H_i)$ where $W_i$ is the weight fraction of the respective PVOH polymers, and $H_i$ is the respective degrees of hydrolysis.

Still further it is desirable to choose a PVOH resin that has a weighted log viscosity average ($\overline{\mu}$) between about 10 and about 25, or between about 12 and 22, or between about 13.5 and about 20. The $\overline{\mu}$ is calculated by the formula $\overline{\mu} = e^{\Sigma W_i \cdot \ln \mu_i}$ where $\mu_i$ is the viscosity for the respective PVOH polymers.

Yet further, it is desirable to choose a PVOH resin that has a Resin Selection Index (RSI) in a range of 0.255 to 0.315, or 0.260 to 0.310, or 0.265 to 0.305, or 0.270 to 0.300, or 0.275 to 0.295, preferably 0.270 to 0.300. The RSI is calculated by the formula $\Sigma(W_i |\mu_i - \mu_r|)/\Sigma(W_i \mu_i)$, wherein $\mu_r$ is seventeen, $\mu_i$ is the average viscosity each of the respective PVOH polymers, and $W_i$ is the weight fraction of the respective PVOH polymers.

Optionally, the water-soluble film preferably is a freestanding film consisting of one layer or a plurality of like layers. The water-soluble film can further optionally consist essentially of the PVOH resin and the plasticizers and additives as described herein, and be essentially free of other film layers which would affect solubility, thermoforming performance, or both solubility and thermoforming performance.

The PVOH resin portion of the film can consist essentially of or consist entirely of PVOH polymers. The water-soluble film can also comprise film-forming polymers in addition to PVOH polymers. These additional polymers can be present in the film at a weight percentage of about 0.1 to about 40%, or at about 1 to about 30%, based on the total weight of the film. Non-limiting examples include starch, cellulosic materials, sulfopolyesters and mixtures thereof. Further non-limiting examples include: polyalkylene oxides, polyacrylic acid, polyvinyl pyrrolidone, cellulose, cellulose ethers, cellulose esters, cellulose amides, polyvinyl acetates, polycarboxylic acids and salts, polyaminoacids or peptides, polyamides, polyacrylamide, copolymers of maleic/acrylic acids, polysaccharides including starch and gelatin, natural gums such as xanthan, and carrageenans.

The water-soluble film can contain other auxiliary agents and processing agents, such as, but not limited to, plasticizers, lubricants, release agents, fillers, extenders, cross-linking agents, antiblocking agents, antioxidants, detackifying agents, antifoams, nanoparticles such as layered silicate-type nanoclays (e.g., sodium montmorillonite), bleaching agents (e.g., sodium bisulfite or others), and other functional ingredients, in amounts suitable for their intended purpose. Embodiments including plasticizers are preferred. The amount of such agents can be up to about 50 wt. %, up to about 20 wt %, or up to 15 wt %, or up to about 10 wt %, or up to about 5 wt. %, e.g., up to 4 wt %, individually or collectively.

The plasticiser can include, but is not limited to, glycerin, diglycerin, sorbitol, ethylene glycol, diethylene glycol, triethylene glycol, tetraethylene glycol, propylene glycol, polyethylene glycols up to 400 MW, neopentyl glycol, trimethylolpropane, polyether polyols, 2-methyl-1,3-propanediol, ethanolamines, and combinations thereof. Preferred plasticizers are glycerin, sorbitol, triethyleneglycol, propylene glycol, 2-methyl-1,3-propanediol, trimethylolpropane, and combinations thereof. The total amount of plasticizer can be in a range of about 1 wt. % to about 40 wt. %, or about 10 wt. % to about 40 wt. %, or about 15 wt. % to about 35 wt. %, or about 20 wt. % to about 30 wt. %, for example about 25 wt. %. Combinations of glycerin, propylene glycol, and sorbitol can be used. Optionally, glycerin can be used in an amount of about 5 wt % to about 30 wt %, or about 5 wt % to about 20 wt %, e.g., about 13 wt %. Optionally, propylene glycol can be used in an amount of about 1 wt. % to about 20 wt. %, or about 3 wt. % to about 10 wt. %, e.g., about 6 wt. %. Optionally, sorbitol can be used in an amount of about 1 wt % to about 20 wt %, or about 2 wt % to about 10 wt %, e.g., about 5 wt %.

The water-soluble film can further have a residual moisture content of at least 4 wt. %, for example in a range of about 4 to about 10 wt. %, as measured by Karl Fischer titration.

Additional specific embodiments of the invention include films that have the combined average degree of hydrolysis, weighted log average viscosity, and Resin Selection Index, as presented in the individual cells in Table I below.

TABLE I

|  | $\overline{\mu}$ 13.5-20 | $\overline{\mu}$ 14-19 | $\overline{\mu}$ 15-18 | $\overline{\mu}$ 16-18 | $\overline{\mu}$ 17-18 | $\overline{\mu}$ 17.5 ± 0.5 |
|---|---|---|---|---|---|---|
| $\overline{H}°$ 84-90 | $\overline{H}°$ 84-90 | $\overline{H}°$ 84-90 | $\overline{H}°$ 84-90 | $\overline{H}°$ 84-90 | $\overline{H}°$ 84-90 | $\overline{H}°$ 84-90 |
|  | $\overline{\mu}$ 13.5-20 | $\overline{\mu}$ 14-19 | $\overline{\mu}$ 15-18 | $\overline{\mu}$ 16-18 | $\overline{\mu}$ 17-18 | $\overline{\mu}$ 17.5 ± 0.5 |
|  | RSI 0.285 ± 0.15 | RSI 0.285 ± 0.15 | RSI 0.285 ± 0.15 | RSI 0.285 ± 0.15 | RSI 0.285 ± 0.15 | RSI 0.285 ± 0.15 |
| $\overline{H}°$ 85-89 | $\overline{H}°$ 85-89 | $\overline{H}°$ 85-89 | $\overline{H}°$ 85-89 | $\overline{H}°$ 85-89 | $\overline{H}°$ 85-89 | $\overline{H}°$ 85-89 |
|  | $\overline{\mu}$ 13.5-20 | $\overline{\mu}$ 14-19 | $\overline{\mu}$ 15-18 | $\overline{\mu}$ 16-18 | $\overline{\mu}$ 17-18 | $\overline{\mu}$ 17.5 ± 0.5 |
|  | RSI 0.285 ± 0.15 | RSI 0.285 ± 0.15 | RSI 0.285 ± 0.15 | RSI 0.285 ± 0.15 | RSI 0.285 ± 0.15 | RSI 0.285 ± 0.15 |
| $\overline{H}°$ 86-88 | $\overline{H}°$ 86-88 | $\overline{H}°$ 86-88 | $\overline{H}°$ 86-88 | $\overline{H}°$ 86-88 | $\overline{H}°$ 86-88 | $\overline{H}°$ 86-88 |
|  | $\overline{\mu}$ 13.5-20 | $\overline{\mu}$ 14-19 | $\overline{\mu}$ 15-18 | $\overline{\mu}$ 16-18 | $\overline{\mu}$ 17-18 | $\overline{\mu}$ 17.5 ± 0.5 |
|  | RSI 0.285 ± 0.15 | RSI 0.285 ± 0.15 | RSI 0.285 ± 0.15 | RSI 0.285 ± 0.15 | RSI 0.285 ± 0.15 | RSI 0.285 ± 0.15 |
| $\overline{H}°$ 86.5 ± 0.5 | $\overline{H}°$ 86.5 ± 0.5 | $\overline{H}°$ 86.5 ± 0.5 | $\overline{H}°$ 86.5 ± 0.5 | $\overline{H}°$ 86.5 ± 0.5 | $\overline{H}°$ 86.5 ± 0.5 | $\overline{H}°$ 86.5 ± 0.5 |
|  | $\overline{\mu}$ 13.5-20 | $\overline{\mu}$ 14-19 | $\overline{\mu}$ 15-18 | $\overline{\mu}$ 16-18 | $\overline{\mu}$ 17-18 | $\overline{\mu}$ 17.5 ± 0.5 |
|  | RSI 0.285 ± 0.15 | RSI 0.285 ± 0.15 | RSI 0.285 ± 0.15 | RSI 0.285 ± 0.15 | RSI 0.285 ± 0.15 | RSI 0.285 ± 0.15 |

Method of Making the Films

One contemplated class of embodiments is characterized by the water-soluble film being formed by, for example, admixing, co-casting, or welding the first PVOH polymer and the second PVOH polymer. If the polymers are first admixed then the water-soluble film is preferably formed by casting the resulting admixture to form a film. If the polymers are welded, the water-soluble film can be formed by, for example, solvent or thermal welding.

The film is useful for creating a pouch to contain a detergent composition comprising cleaning actives thereby forming a packet. The cleaning actives may take any form such as powders, gels, pastes, liquids, tablets or any combination thereof. The film is also useful for any other application in which improved wet handling and low cold water residues are desired. The film forms at least one side wall of the pouch and/or packet, optionally the entire pouch and/or packet, and preferably an outer surface of the at least one sidewall.

The film described herein can also be used to make a pouch with two or more compartments made of the same film or in combination with films of other polymeric materials. Additional films can, for example, be obtained by casting, blow-molding, extrusion or blown extrusion of the same or a different polymeric material, as known in the art. In one type of embodiment, the polymers, copolymers or derivatives thereof suitable for use as the additional film are selected from polyvinyl alcohols, polyvinyl pyrrolidone, polyalkylene oxides, polyacrylic acid, cellulose, cellulose ethers, cellulose esters, cellulose amides, polyvinyl acetates, polycarboxylic acids and salts, polyaminoacids or peptides, polyamides, polyacrylamide, copolymers of maleic/acrylic acids, polysaccharides including starch and gelatin, natural gums such as xanthan, and carrageenans. For example, polymers can be selected from polyacrylates and water-soluble acrylate copolymers, methylcellulose, carboxymethylcellulose sodium, dextrin, ethylcellulose, hydroxyethyl cellulose, hydroxypropyl methylcellulose, maltodextrin, polymethacrylates, and combinations thereof, or selected from polyvinyl alcohols, polyvinyl alcohol copolymers and hydroxypropyl methyl cellulose (HPMC), and combinations thereof. One contemplated class of embodiments is characterized by the level of polymer in the pouch material, for example the PVOH resin, as described above, being at least 60%.

Pouches

The pouches of the present disclosure comprise at least one sealed compartment. Thus the pouches may comprise a single compartment or multiple compartments. In embodiments comprising multiple compartments, each compartment may contain identical and/or different compositions. In turn, the compositions may take any suitable form including, but not limited to liquid, solid and combinations thereof (e.g. a solid suspended in a liquid). In some embodiments, the pouch comprises a first, second and third compartment, each of which respectively contains a different first, second and third composition. In some embodiments, the compositions may be visually distinct as described in European Patent Application Number 09161692.0 (filed Jun. 2, 2009 and assigned to the Procter & Gamble Company).

The compartments of multi-compartment pouches may be of the same or different size(s) and/or volume(s). The compartments of the present multi-compartment pouches can be separate or conjoined in any suitable manner. In some embodiments, the second and/or third and/or subsequent compartments are superimposed on the first compartment. In one embodiment, the third compartment may be superimposed on the second compartment, which is in turn superimposed on the first compartment in a sandwich configuration. Alternatively, the second and third compartments may be superimposed on the first compartment. However it is also equally envisaged that the first, second and optionally third and subsequent compartments may be attached to one another in a side by side relationship. The compartments may be packed in a string, each compartment being individually separable by a perforation line. Hence each compartment may be individually torn-off from the remainder of the string by the end-user, for example, so as to pre-treat or post-treat a fabric with a composition from a compartment.

In some embodiments, multi-compartment pouches comprise three compartments consisting of a large first compartment and two smaller compartments. The second and third smaller compartments are superimposed on the first larger compartment. The size and geometry of the compartments are chosen such that this arrangement is achievable. The geometry of the compartments may be the same or different. In some embodiments, the second and optionally third compartment each has a different geometry and shape as compared to the first compartment. In these embodiments, the second and optionally third compartments are arranged in a design on the first compartment. The design may be decorative, educative or illustrative, for example to illustrate a concept or instruction, and/or used to indicate origin of the product. In some embodiments, the first compartment is the largest compartment having two large faces sealed around the perimeter, and the second compartment is smaller, covering less than about 75%, or less than about 50% of the surface area of one face of the first compartment. In embodiments in which there is a third compartment, the aforementioned structure may be the same but the second and third compartments cover less than about 60%, or less than about 50%, or less than about 45% of the surface area of one face of the first compartment.

The pouches of the present disclosure may comprise one or more different films. For example, in single compartment embodiments, the pouch may be made from one wall that is folded onto itself and sealed at the edges, or alternatively, two walls that are sealed together at the edges. In multiple compartment embodiments, the pouch may be made from one or more films such that any given pouch compartment may comprise walls made from a single film or multiple films having differing compositions. In one embodiment, a multi-compartment pouch comprises at least three walls: an outer upper wall; an outer lower wall; and a partitioning wall. The outer upper wall and the outer lower wall are generally opposing and form the exterior of the pouch. The partitioning wall is interior to the pouch and is secured to the generally opposing outer walls along a seal line. The partitioning wall separates the interior of the multi-compartment pouch into at least a first compartment and a second compartment.

Pouches may be made using any suitable equipment and method. For example, single compartment pouches may be made using vertical form filing, horizontal form filling or rotary drum filling techniques commonly known in the art. Such processes may be either continuous or intermittent. The film may be dampened, and/or heated to increase the malleability thereof. The method may also involve the use of a vacuum to draw the film into a suitable mold. The vacuum drawing the film into the mold can be applied for about 0.2 seconds to about 5 seconds, or about 0.3 seconds to about 3 seconds, or about 0.5 seconds to about 1.5 seconds, once the film is on the horizontal portion of the surface. This vacuum can be such that it provides an under-pressure of between 10 mbar to 1000 mbar, or from 100 mbar to 600 mbar, for example.

The molds, in which the pouches may be made, can have any shape, length, width and depth, depending on the required dimensions of the pouches. The molds may also vary in size and shape from one to another, if desirable. For example, the volume of the final pouches may be about 5 ml to about 300 ml, or about 10 ml to 150 ml, or about 20 ml to about 100 ml, and that the mold sizes are adjusted accordingly.

Heat can be applied to the film in the process commonly known as thermoforming. The heat may be applied using any suitable means. For example, the film may be heated directly by passing it under a heating element or through hot air, prior to feeding it onto a surface or once on a surface. Alternatively it may be heated indirectly, for example by heating the surface or applying a hot item onto the film. In some embodiments, the film is heated using an infra red light. The film may be heated to a temperature of about 50 to about 150° C., about 50 to about 120° C., about 60 to about 130° C., about 70 to about 120° C., or about 60 to about 90° C. Alternatively, the film can be wetted by any suitable means, for example directly by spraying a wetting agent (including water, solutions of the film material or plasticizers for the film material) onto the film, prior to feeding it onto the surface or once on the surface, or indirectly by wetting the surface or by applying a wet item onto the film.

Once a film has been heated and/or wetted, it may be drawn into an appropriate mold, preferably using a vacuum. The filling of the molded film can be accomplished utilizing by any suitable means. In some embodiments, the most preferred method will depend on the product form and required speed of filling. In some embodiments, the molded film is filled by in-line filling techniques. The filled, open pouches are then closed, using a second film, by any suitable method. This may be accomplished while in horizontal position and in continuous, constant motion. The closing may be accomplished by continuously feeding a second film, preferably water-soluble film, over and onto the open pouches and then preferably sealing the first and second film together, typically in the area between the molds and thus between the pouches.

Any suitable method of sealing the pouch and/or the individual compartments thereof may be utilized. Non-limiting examples of such means include heat sealing, solvent welding, solvent or wet sealing, and combinations thereof. Typically, only the area which is to form the seal is treated with heat or solvent. The heat or solvent can be applied by any method, typically on the closing material, and typically only on the areas which are to form the seal. If solvent or wet sealing or welding is used, it may be preferred that heat is also applied. Preferred wet or solvent sealing/welding methods include applying selectively solvent onto the area between the molds, or on the closing material, by for example, spraying or printing this onto these areas, and then applying pressure onto these areas, to form the seal. Sealing rolls and belts as described above (optionally also providing heat) can be used, for example.

The formed pouches may then be cut by a cutting device. Cutting can be accomplished using any known method. It may be preferred that the cutting is also done in continuous manner, and preferably with constant speed and preferably while in horizontal position. The cutting device can, for example, be a sharp item or a hot item, whereby in the latter case, the hot item 'burns' through the film/sealing area.

The different compartments of a multi-compartment pouch may be made together in a side-by-side style wherein the resulting, conjoined pouches may or may not be separated by cutting. Alternatively, the compartments can be made separately.

In some embodiments, pouches may be made according to a process comprising the steps of:
  a) forming a first compartment (as described above);
  b) forming a recess within some or all of the closed compartment formed in step (a), to generate a second molded compartment superposed above the first compartment;
  c) filling and closing the second compartments by means of a third film;
  d) sealing the first, second and third films; and
  e) cutting the films to produce a multi-compartment pouch.

The recess formed in step (b) may be achieved by applying a vacuum to the compartment prepared in step a).

In some embodiments, second, and/or third compartment(s) can be made in a separate step and then combined with the first compartment as described in WO 2009/152031 (filed Jun. 13, 2008 and assigned to the Procter & Gamble Company).

In some embodiments, pouches may be made according to a process comprising the steps of:
  a) forming a first compartment, optionally using heat and/or vacuum, using a first film on a first forming machine;
  b) filling the first compartment with a first composition;
  c) on a second forming machine, deforming a second film, optionally using heat and vacuum, to make a second and optionally third molded compartment;
  d) filling the second and optionally third compartments;
  e) sealing the second and optionally third compartment using a third film;
  f) placing the sealed second and optionally third compartments onto the first compartment;
  g) sealing the first, second and optionally third compartments; and
  h) cutting the films to produce a multi-compartment pouch The first and second forming machines may be selected based on their suitability to perform the above process. In some embodiments, the first forming machine is preferably a horizontal forming machine, and the second forming machine is preferably a rotary drum forming machine, preferably located above the first forming machine.

It should be understood that by the use of appropriate feed stations, it may be possible to manufacture multi-compartment pouches incorporating a number of different or distinctive compositions and/or different or distinctive liquid, gel or paste compositions.

Pouch Compositions

The present pouches may contain various compositions. A multi-compartment pouch may contain the same or different compositions in each separate compartment. This feature of the disclosure may be utilized to keep compositions containing incompatible ingredients (e.g., bleach and enzymes) physically separated or partitioned from each other. It is believed that such partitioning may expand the useful life and/or decrease physical instability of such ingredients. Additionally or alternatively, such partitioning may provide aesthetic benefits as described in European Patent Application Number 09161692.0 (filed Jun. 2, 2009 and assigned to the Procter & Gamble Company).

Non-limiting examples of useful compositions include light duty and heavy duty liquid detergent compositions, hard surface cleaning compositions, fabric enhancers, detergent gels commonly used for laundry, and bleach and laundry additives, shampoos, body washes, and other personal care compositions. Compositions of use in the present pouches may take the form of a liquid, solid or a powder. Liquid compositions may comprise a solid. Solids may include powder or agglomerates, such as micro-capsules, beads, noodles or one or more pearlized balls or mixtures thereof. Such a solid element may provide a technical benefit, through the wash or as a pre-treat, delayed or sequential release component; additionally or alternatively, it may provide an aesthetic effect.

In pouches comprising laundry, laundry additive and/or fabric enhancer compositions, the compositions may comprise one or more of the following non-limiting list of ingredients: fabric care benefit agent; detersive enzyme; deposition aid; rheology modifier; builder; bleach; bleaching agent; bleach precursor; bleach booster; bleach catalyst; perfume and/or perfume microcapsules (see for example U.S. Pat. No. 5,137,646); perfume loaded zeolite; starch encapsulated accord; polyglycerol esters; whitening agent; pearlescent agent; enzyme stabilizing systems; scavenging agents including fixing agents for anionic dyes, complexing agents for anionic surfactants, and mixtures thereof; optical brighteners or fluorescers; polymer including but not limited to soil release polymer and/or soil suspension polymer; dispersants; antifoam agents; non-aqueous solvent; fatty acid; suds suppressors, e.g., silicone suds suppressors (see: U.S. Publication No. 2003/0060390 A1, ¶ 65-77); cationic starches (see: US 2004/0204337 A1 and US 2007/0219111 A1); scum dispersants (see: US 2003/0126282 A1, ¶89-90); dyes; colorants; opacifier; antioxidant; hydrotropes such as toluenesulfonates, cumenesulfonates and naphthalenesulfonates; color speckles; colored beads, spheres or extrudates; clay softening agents. Any one or more of these ingredients is further described in described in European Patent Application Number 09161692.0 (filed Jun. 2, 2009), U.S. Publication Number 2003/0139312A1 (filed May 11, 2000) and U.S. Patent Application No. 61/229,981 (filed Jul. 30, 2009), each of which are assigned to the Procter & Gamble Company. Additionally or alternatively, the compositions may comprise surfactants and/or solvent systems, each of which is described below.

Surfactants:

The compositions of the present disclosure preferably comprise from about 1% to 80% by weight of a surfactant. Surfactant is particularly preferred as a component of the first composition. Preferably, the first composition comprises from about 5% to 50% by weight of surfactant. The second and third compositions may comprise surfactant at levels of from 0.1 to 99.9%.

Detersive surfactants utilized can be of the anionic, nonionic, zwitterionic, ampholytic or cationic type or can comprise compatible mixtures of these types. More preferably surfactants are selected from the group consisting of anionic, nonionic, cationic surfactants and mixtures thereof. Detergent surfactants useful herein are described in U.S. Pat. No. 3,664,961, Norris, issued May 23, 1972, U.S. Pat. No. 3,919,678, Laughlin et al., issued Dec. 30, 1975, U.S. Pat. No. 4,222,905, Cockrell, issued Sep. 16, 1980, and in U.S. Pat. No. 4,239,659, Murphy, issued Dec. 16, 1980. Anionic and nonionic surfactants are preferred.

Useful anionic surfactants can themselves be of several different types. For example, water-soluble salts of the higher fatty acids, i.e., "soaps", are useful anionic surfactants in the compositions herein. This includes alkali metal soaps such as the sodium, potassium, ammonium, and alkyl ammonium salts of higher fatty acids containing from about 8 to about 24 carbon atoms, and preferably from about 12 to about 18 carbon atoms. Soaps can be made by direct saponification of fats and oils or by the neutralization of free fatty acids. Particularly useful are the sodium and potassium salts of the mixtures of fatty acids derived from coconut oil and tallow, i.e., sodium or potassium tallow and coconut soap.

Additional non-soap anionic surfactants which are suitable for use herein include the water-soluble salts, preferably the alkali metal, and ammonium salts, of organic sulfuric reaction products having in their molecular structure an alkyl group containing from about 10 to about 20 carbon atoms and a sulfonic acid or sulfuric acid ester group. (Included in the term "alkyl" is the alkyl portion of acyl groups.) Examples of this group of synthetic surfactants include: a) the sodium, potassium and ammonium alkyl sulfates, especially those obtained by sulfating the higher alcohols ($C_8$-$C_{18}$ carbon atoms) such as those produced by reducing the glycerides of tallow or coconut oil; b) the sodium, potassium and ammonium alkyl polyethoxylate sulfates, particularly those in which the alkyl group contains from 10 to 22, preferably from 12 to 18 carbon atoms, and wherein the polyethoxylate chain contains from 1 to 15, preferably 1 to 6 ethoxylate moieties; and c) the sodium and potassium alkylbenzene sulfonates in which the alkyl group contains from about 9 to about 15 carbon atoms, in straight chain or branched chain configuration, e.g., those of the type described in U.S. Pat. Nos. 2,220,099 and 2,477,383. Especially valuable are linear straight chain alkylbenzene sulfonates in which the average number of carbon atoms in the alkyl group is from about 11 to 13, abbreviated as $C_{11}$-$C_{13}$ LAS.

In some embodiments, the total anionic surfactant, i.e., soap and non-soap anionic, is present in the composition at a weight percentage of about 1 wt % to about 65 wt %, about 2 wt % to about 50 wt %, or about 5 wt % to about 45 wt %.

Preferred nonionic surfactants are those of the formula $R^1(OC_2H_4)OH$, wherein $R^1$ is a $C_{10}$-$C_{16}$ alkyl group or a $C_8$-$C_{12}$ alkyl phenyl group, and n is from 3 to about 80. Particularly preferred are condensation products of $C_{12}$-$C_{15}$ alcohols with from about 5 to about 20 moles of ethylene oxide per mole of alcohol, e.g., $C_{12}$-$C_{13}$ alcohol condensed with about 6.5 moles of ethylene oxide per mole of alcohol.

Solvent System:

The solvent system in the present compositions can be a solvent system containing water alone or mixtures of organic solvents with water. Preferred organic solvents include 1,2-propanediol, ethanol, glycerol, dipropylene glycol, methyl propane diol and mixtures thereof. Other lower alcohols, $C_1$-$C_4$ alkanolamines such as monoethanolamine and triethanolamine, can also be used. Solvent systems can be absent, for example from anhydrous solid embodiments of the disclosure, but more typically are present at levels in the range of from about 0.1% to about 98%, preferably at least about 1% to about 50%, more usually from about 5% to about 25%.

The compositions herein can generally be prepared by mixing the ingredients together. If a pearlescent material is used it should be added in the late stages of mixing. If a rheology modifier is used, it is preferred to first form a pre-mix within which the rheology modifier is dispersed in a portion of the water and optionally other ingredients eventually used to comprise the compositions. This pre-mix is formed in such a way that it forms a structured liquid. To this structured pre-mix can then be added, while the pre-mix is under agitation, the surfactant(s) and essential laundry adjunct materials, along with water and whatever optional detergent composition adjuncts are to be used.

The pH of the useful compositions may be about 4 to about 12, about 5 to about 11, about 6 to about 10, about 6.5 to about 8.5, or about 7.0 to about 7.5. Laundry detergent compositions may have a pH of about 8 to about 10. Laundry detergent additive compositions may have a pH of about 4 to about 8. Fabric enhancers may have a pH of from about 4 to about 8.

The pH of the detergent is defined as the pH of an aqueous 10% (weight/volume) solution of the detergent at 20±2° C.; for solids and powdered detergent this is defined as the pH of an aqueous 1% (weight/volume) solution of the detergent at 20±2° C. Any meter capable of measuring pH to ±0.01 pH units is suitable. Orion meters (Thermo Scientific, Clintinpark—Keppekouter, Ninovesteenweg 198, 9320 Erembodegem—Aalst, Belgium) or equivalent are acceptable instruments. The pH meter should be equipped with a suitable glass electrode with calomel or silver/silver chloride reference. An example includes Mettler DB 115. The electrode shall be stored in the manufacturer's recommended electrolyte solution.

The 10% aqueous solution of the detergent is prepared according to the following procedure. A sample of 10±0.05 grams is weighted with a balance capable of accurately measuring to ±0.02 grams. The sample is transferred to the a 100 mL volumetric flask, diluted to volume with purified water (deionised and/or distilled water are suitable as long as the conductivity of the water is <5 μS/cm), and thoroughly mixed. About 50 mL of the resulting solution is poured into a beaker, the temperature is adjusted to 20±2° C. and the pH is measured according to the standard procedure of the pH meter manufacturer (it is critical to follow the manufacturer's instructions to also set up and calibrate the pH assembly).

For solid and powdered detergents, the 1% aqueous solution of the detergent is prepared according to the following procedure. A sample of 10±0.05 grams is weighted with a balance capable of accurately measuring to ±0.02 grams. The sample is transferred to a volumetric flask of 1000 mL, diluted to volume with purified water (deionised and/or distilled water are suitable as long as the conductivity of the water is <5 μS/cm), and thoroughly mixed. About 50 mL of the resulting solution is poured into a beaker, the temperature is adjusted to 20±2° C. and the pH is measured according to the standard procedure of the pH meter manufacturer (it is critical to follow the manufacturer's instructions to also set up and calibrate the pH assembly).

Packaging

Pouches of the present disclosure may be placed in packaging for storage and/or sale. In some embodiments, the package may be a see-through or partially see-through container, for example a transparent or translucent bag, tub, carton or bottle. The package may be made of plastic or any other suitable material, provided the material is strong enough to protect the pouches during transport. This kind of pack is also very useful because the user does not need to open the pack to see how many pouches remain therein. Alternatively, the pack can have non-see-through outer packaging, perhaps with indicia or artwork representing the visually-distinctive contents of the pack. In some embodiments, the package may provide at least a partial moisture barrier.

Process of Washing:

The pouches of the present disclosure are suitable for cleaning applications including, but not limited to cleaning laundry, dishes and the body (e.g. shampoo or soap). The pouches are suitable for hand and/or machine washing conditions. When machine washing, the pouch may be delivered from a dispensing drawer or may be added directly into the washing machine drum.

Test Methods:

Test methods utilized to obtain data relating to claimed film characteristics are provided below.

Measuring Viscosity:

The viscosity of a PVOH polymer (μ) is determined by measuring a freshly made solution using a Brookfield LV type viscometer with UL adapter as described in British Standard EN ISO 15023-2:2006 Annex E Brookfield Test method. It is international practice to state the viscosity of 4% aqueous polyvinyl alcohol solutions at 20° C. All viscosities specified herein in centipoise (cP) should be understood to refer to the viscosity of 4% aqueous polyvinyl alcohol solution at 20° C., unless specified otherwise.

Aged Film:

Aged film is made as follows. A 3"×3" pouch is made from fresh film and sealed therein is 50 ml of the Test Composition the ingredients of which are described in Table II. The glossy side of the fresh film forms the outside of the pouch and the matt side of the film forms the inside of the pouch.

TABLE II

|  | Wt % of Test Composition |
|---|---|
| Linear $C_9$-$C_{15}$ Alkylbenzene sulfonic acid | 23.2 |
| $C_{12-14}$ alkyl 7-ethoxylate | 19.1 |
| Citric Acid | 0.6 |
| Top palm kernel fatty acid | 10.8 |
| Propane diol | 14.0 |
| Glycerol | 5.7 |
| Hydroxyethane diphosphonic acid (Dequest 2010) | 1.2 |
| Magnesium Chloride | 0.2 |
| Enzymes | 1.6 |
| Ethoxysulfated Hexamethylene Diamine Dimethyl Quat |  |
| $K_2SO_3$ | 0.2 |
| Perfume | 1.7 |
| Hydrogenated castor oil | 0.14 |
| Water | 8.5 |
| Monoethanol amine | 8.8 |
| Minor | To 100% |

In order to ensure that the film region that is to be tested is in full contact with the Test Composition, the pouches are filled to minimize air bubbles. The pouches are then placed onto an aluminum tray lined with notebook paper. The tray is then heat sealed in a 4 mil High Density Polyethylene ("HDPE") bag. A 17"×22" HDPE bag is used to enclose a 13"×18" tray. A 13.5"×17" HDPE bag is used to enclose a 9.5"×13" tray. The tray is maintained in an orientation such that any air bubble(s) inside the pouch are kept in a corner of the pouch away from the film region that is to be tested. The trays containing the pouches are placed into an oven controlled at 38° C. and 45% Relative Humidity (RH) for 120 hours. The pouches are then removed from the oven, kept in the HDPE bag and allowed to return to room temperature (20+/−5° C.) at about 25% RH. Within 5 to 8 hours of being removed from the oven, the pouches are cut open being careful not to cut the film region to be tested. The Test Composition is drained from the pouch. The pouch is further cut to remove all sealed areas and the film in the region to be tested is wiped clean from any remaining Test Composition. Within 10 minutes of cutting the pouch open, the resulting aged film is then subjected to the Burst Strength and Slide Dissolution tests described below.

Figure 1:
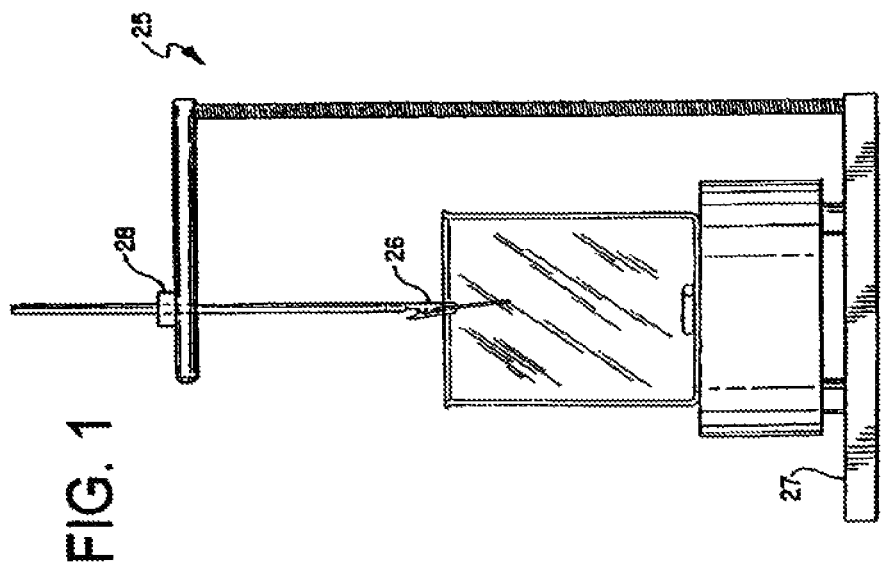
FIG. 1 is a perspective view of a test apparatus used to determine the water disintegration and dissolution times of film samples.
Figure 2:
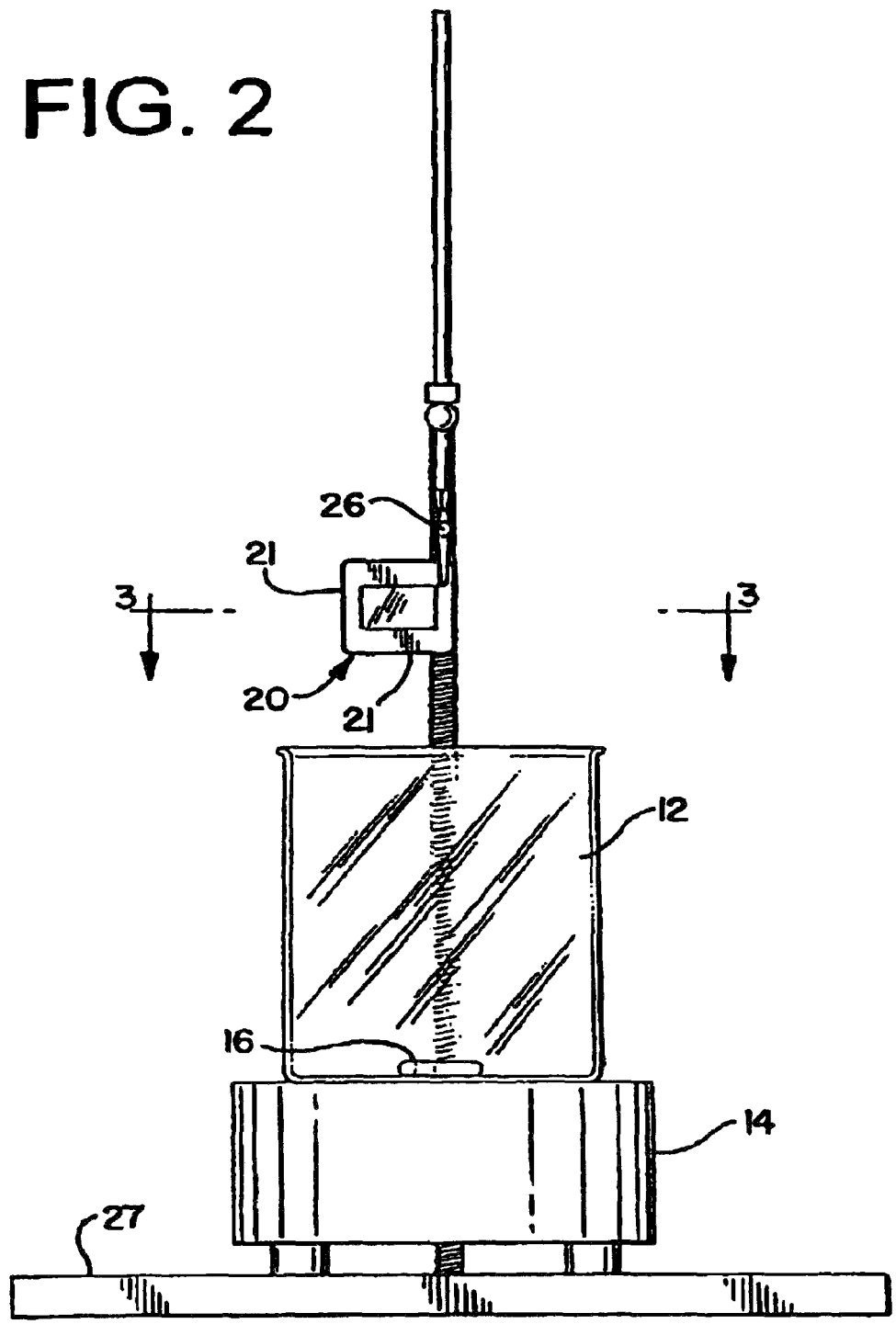
FIG. 2 is a perspective view of the test apparatus and test set-up illustrating the procedure for determining the water-solubility of film samples.

Slide Dissolution Test:

The MONOSOL Test Method 205 (MSTM 205) is disclosed with reference to appended FIGS. 1-3.

Apparatus and Materials:

600 mL Beaker 12
Magnetic Stirrer 14 (Labline Model No. 1250 or equivalent)
Magnetic Stirring Rod 16 (5 cm)
Thermometer (0 to 100° C., ±1° C.)
Template, Stainless Steel (3.8 cm×3.2 cm)
Timer, (0-300 seconds, accurate to the nearest second)
Polaroid 35 mm Slide Mount 20 (or equivalent)
MONOSOL 35 mm Slide Mount Holder 25 (or equivalent, see FIG. 1)
Distilled Water Test Specimen:

1. Cut three test specimens from film sample using stainless steel template (i.e., 3.8 cm×3.2 cm specimen). If cut from a film web, specimens should be cut from areas of web evenly spaced along the transverse direction of the web.

2. Lock each specimen in a separate 35 mm slide mount 20.
3. Fill beaker 12 with 500 mL of distilled water. Measure water temperature with thermometer and, if necessary, heat or cool water to maintain temperature at 10° C. (about 50° F.).
4. Mark height of column of water. Place magnetic stirrer 14 on base 27 of holder 25. Place beaker 12 on magnetic stirrer 14, add magnetic stirring rod 16 to beaker 12, turn on stirrer 14, and adjust stir speed until a vortex develops which is approximately one-fifth the height of the water column. Mark depth of vortex.
5. Secure the 35 mm slide mount 20 in the alligator clamp 26 of the MONOSOL 35 mm slide mount holder 25 (FIG. 1) such that the long end 21 of the slide mount 20 is parallel to the water surface, as illustrated in FIG. 2. The depth adjuster 28 of the holder 25 should be set so that when dropped, the end of the clamp 26 will be 0.6 cm below the surface of the water. One of the short sides 23 of the slide mount 20 should be next to the side of the beaker 12 with the other positioned directly over the center of the stiffing rod 16 such that the film surface is perpendicular to the flow of the water, as illustrated in FIG. 3.
6. In one motion, drop the secured slide and clamp into the water and start the timer. Disintegration occurs when the film breaks apart. When all visible film is released from the slide mount, raise the slide out of the water while continuing to monitor the solution for undissolved film fragments. Dissolution occurs when all film fragments are no longer visible and the solution becomes clear.

Data Recording:
The results should include the following:
complete sample identification;
individual and average disintegration and dissolution times; and
water temperature at which the samples were tested.
The time for complete dissolution (in seconds) is obtained.

Stress at 100% Elongation Test:

The stress of a film at 100% elongation is measured utilizing the ASTM D 882, "Standard Test Method for Tensile Properties of Thin Plastic Sheeting". The test is conducted on a Model 5544 Instron® Tensile Tester. The Instron® grips utilized in the test may impact the test results. Consequently, the present test is conducted utilizing Instron® grips having model number 2702-032 faces, which are rubber coated and 25 mm wide.

Ultimate Tensile Strength Test:

The ultimate tensile strength is measured utilizing the ASTM D 882, "Standard Test Method for Tensile Properties of Thin Plastic Sheeting". The test is conducted on a Model 5544 Instron® Tensile Tester. The Instron® grips utilized in the test may impact the test results. Consequently, the present test is conducted utilizing Instron® grips having model number 2702-032 faces, which are rubber coated and 25 mm wide.

Burst Strength Test:

A 4 μl drop of deionized water obtained by reverse osmosis (at 23° C.) is placed on film region to be tested (at about 23° C. and an RH of about 25%) and clamped securely with a 2.5 pounds per square inch ("psig") pressure compressed air behind the film. The droplet is gently placed in the center of the film's clamped circular exposed region which is 21 mm in diameter. The time between droplet placement and burst (i.e., the time at which the pressure is 2.0 psig or lower) is recorded. Film gauge is also recorded. The film region to be tested receives the droplet on its glossy side which forms the exterior surface of a typical pouch. Thus the glossy side of fresh or aged film receives the droplet in the present test.

Thermoforming Test:

The films described herein preferably are thermoformable. Herein, a film is thermoformable (passes a Thermoforming Converting Test) if the molded film obtained after a thermoforming process has a Pinhole Test Result of less than 2%, preferably less than 1%, and more preferably less than 0.5%. The molded film obtained after a thermoforming process optionally can have a Pressurized Pinhole Test Result of less than 4%, preferably, less than 2%, and more preferably less than 1%.

Thermoforming a film is the process of heating the film, shaping it in a mold, and then allowing the film to cool, whereupon the film will hold the shape of the mold. Thermoforming can be performed by any one or more of the following processes: the manual draping of a thermally softened film over a mold, or the pressure induced shaping of a softened film to a mold (e.g., vacuum forming), or the automatic high-speed indexing of a freshly extruded sheet having an accurately known temperature into a forming and trimming station, or the automatic placement, plug and/or pneumatic stretching and pressuring forming of a film. The extent of the film stretch is defined by the areal draw ratio which is the pocket (or cavity) surface area divided by the film surface area before thermoforming. The areal draw ratio (also called areal depth of draw) can be calculated according to the method described in *Technology of Thermoforming*, James L. Throne, Hanser publisher, (1996) Chapter 7.4, pg 488-494 (ISBN 3-446-17812-0). Herein for thermoformed films, the areal draw ratio can be between 1.05 and 2.7; preferably in a range of 1.2 to 2.3; most preferably in a range of 1.3 to 2.0.

The Pinhole Test can be conducted on a film with a starting thickness in a range of 25 to 150 μm, preferably in a range of 50 to 100 μm, most preferably in a range of 60 to 90 μm. The thickness of the film can be measured with any technique known by one skilled in the art. For example, this can be achieved using the electronic thickness tester, Thwing-Albert model 89-100 (Thwing-Albert; 14W. Collings Avenue, West Berlin N.J. 08091 USA). It is required that the film is conditioned at 22±5° C. and 40±20% relative humidity for at least 24 hours prior to the thickness measurement. A sheet of film of about 60 mm width by about 60 mm length is obtained and 25 measurements are obtained (spaced throughout the sheet). The thickness is thus the average of the 25 measurements+/− standard deviation.

The Pinhole Test and the Pressurized Pinhole Test measure the leakage percentage of pouches that include the thermoformed film as at least one side of the pouch. The preparation of samples for testing includes the process for preparing a water-soluble container from PVOH film by thermoforming the PVOH film into a pocket, filling the pocket with a composition, placing a second film on top of the filled pocket and sealing the two film together. The sealing can be done by any suitable method. For example, the sealing can be performed as disclosed in WO 02/16205, the disclosure of which is incorporated herein. Here, a film with a thickness of 76±4 μm is thermoformed at 105±15° C. into a cavity with an areal draw ratio of 2.0 at atmospheric conditions of 22±5° C. and 40±20% RH, to form a thermoformed film having a minimum thickness of 30±5 μm. The thermoformed film is then filled with a test solution that includes the materials in Table 1, and sealed to form a pouch.

TABLE III

| | Wt % |
|---|---|
| Linear $C_9$-$C_{15}$ Alkylbenzene sulfonic acid | 24 |
| $C_{12-14}$ alkyl 7-ethoxylate | 20.8 |
| Citric Acid | 0.6 |
| Top palm kernel fatty acid | 14.8 |
| Propane diol | 14.2 |
| Glycerol | 5.0 |
| Hydroxyethane diphosphonic acid (Dequest 2010) | 1.2 |
| Magnesium Chloride | 0.2 |
| $K_2SO_3$ | 0.4 |
| Water | 9.4 |
| Monoethanol amine | 9.0 |
| Minor | To 100% |

Next, the pouches are individually laid upon absorbing paper with the thermoformed film in contact with the absorbing paper, for 24 hours at 22±5° C. and 40±20% RH. After 24 hours, all the pouches that have leaked on the thermoformed portion of film (in contrast to leaking through the seal or through a defect created by the sealing process) are counted. The percentage of pouches with pinholes is then determined by the ((number of leaked pouches)/total number of pouches)*100%. Preferably, about five hundred pouches are manufactured and tested. Notably, applying pressure to the sealed pouch can facilitate the discovery of pinholes. Thereby, the Pressurized Pinhole Test follows the same process as the Pinhole Test with the added step that after the pouch is placed on the absorbing paper a weight (about 0.1N/cm$^2$) is placed upon the pouch.

EXAMPLES

The following are exemplary embodiments of film and compositions combined to make pouches according to the present disclosure. Unless otherwise designated all values are provided as weight percentages of the total composition and "to 100", or "balance", or the like, means the referenced ingredient is added to bring the sum of the values provided to 100.

I. Film

The following samples were prepared by admixing the designated weight percentages of the designated polymers. PVOH polymers are typically designated by a polymer grade product number. For example, the PVOH polymer 13-88 is a partially hydrolyzed polyvinyl alcohol with a specified, nominal viscosity of about 13 cP and a nominal degree of hydrolysis, expressed as a percentage of vinyl acetate units converted to vinyl alcohol units, of about 88%. The PVOH polymers used to form the examples listed below are designated by their polymer grade product numbers.

Referring to Table IV, the films are prepared by admixing the designated polymers in water with plasticizers and other minor additives such as processing aids. The wt. % of resins in the tables below are specified as parts by weight of the total PVOH resin content. The resin forms the major fraction of the film components by dry weight (about 67% to about 75% by total weight, average 69%), together with about 19 wt. % to 29 wt. % (average 24 wt. %) total plasticizers including glycerine, propylene glycol, and sorbitol; and minor amounts (about 3 wt. % to 8 wt. % total) of stabilizers and processing aids including antiblocks, antifoams, bleaching agents, fillers, and surfactant wetting agents. The solution is maintained at a temperature in the range of from about 71° C. to about 93° C. and cast by applying the hot solution to a smooth surface and drying off water to create a film having a thickness in the range of from about 60 to 90 μm (typical 76 m) and a residual moisture content of about 4 to about 10 wt. %, as measured by Karl Fischer titration.

TABLE IV

| Sample ID | Wt % 13-88 | Wt % 23-88 | $\overline{H}°$ | $\overline{(\mu)}$ | RSI |
|---|---|---|---|---|---|
| C1 | 100 | | 88 | 13 | 0.308 |
| 1 | 50 | 50 | 88.0 | 17.2 | 0.278 |
| 2 | 50 | 50 | 87.4 | 18.4 | 0.278 |
| 3 | 50 | 50 | 86.8 | 16.9 | 0.278 |
| 4 | 60 | 40 | 88.3 | 16.9 | 0.282 |

II. Composition

The following compositions A through Q are of use in one or more compartments of the pouches of the present disclosure.

Compositions A through G are liquid laundry detergents prepared by mixing ingredients found in Tables V and VI:

TABLE V

| | A | B | C | D | E | F |
|---|---|---|---|---|---|---|
| Glycerol | 3 | 5 | 3 | 0.6 | 5 | 5.3 |
| 1,2 Propanediol | 16 | 14 | 16 | | 12 | 10 |
| Citric acid | 1 | | 1 | | 0.5 | 0.5 |
| Isopropanol | | | | 7.7 | | |
| NaOH | 0.5 | | 3.5 | | 1 | |
| Marlipal $C_{12-14}EO_7$ | 22 | | 22 | | 14 | 20.1 |
| $C_{13-15}EO_9$ | 1 | 15 | 1 | | | |
| $C_{9-11}EO_9$ | | | | 72 | | |
| Linear alkyl benzene sulfonic acid[1] | 16 | 25 | 16 | | 23 | 24.6 |
| $C_{12-18}$ Fatty acid | 16 | 5 | 16 | | 6 | 16.4 |
| $C_{12-14}$ alkyl ethoxy 3 sulfate | | | | | 9 | |
| Enzymes | 2.5 | 1.5 | 2.5 | 2.0 | 1.5 | 2.0 |
| Polyethyleneimine ethoxylate PEI 600 E20 | 2 | | 2 | | | 3.0 |
| Diethylenetriamine Pentaacetic Acid | | 0.9 | | | 1 | |

TABLE V-continued

|  | A | B | C | D | E | F |
|---|---|---|---|---|---|---|
| Dequest 2010 | 1.5 |  | 1.5 |  | 1 | 1.1 |
| Optical brightening agent | 1 | 1.2 | 1 | 0.5 |  | 0.2 |
| Mg Cl$_2$ |  |  |  |  |  | 0.2 |
| Potassium sulfite |  |  |  |  | 0.35 | 0.2 |
| Structurant |  | 0.21 |  |  | 0.15 |  |
| Silicone softening agent (PDMS) |  |  |  |  |  | 2.5 |
| Water | 8 | 10 | 8 | 6 | 9 |  |
| Miscellaneous (dyes, aesthetics, perfume etc) | To 100 | To 100 | To 100 | To 100 | To 100 |  |
| Monoethanol amine | To pH 7.6 | To pH 7.5 | To pH 7.4 | To pH 7.6 | To pH 7.6 | To pH 7.6 |

[1]Preferred LAS also comprise an alkyl group comprising from about 9 to about 15 carbon atoms, in straight chain configuration.

TABLE VI

|  | G |
|---|---|
| Dimethyl monoethyl ether | 73.87 |
| Sodium lauryl sulfate | 6.00 |
| Dimethyl glyoxime | 1.00 |
| Isopropyl alcohol | 0.5 |
| Triazine stilbene (Tinopal UNPA-GX) | 0. |
| Monoethanol amine | 1.52 |
| Linear alcohol ethoxylate (Surfonic LF-17) | 13.61 |
| d-limonene | 3.00 |

Composition H is a bleach additive prepared by mixing the ingredients in Table VII:

TABLE VII

|  | H |
|---|---|
| Sodium Percarbonate | 25 |
| Bleach activator | 7 |
| Sodium Carbonate | 15 |
| Sodium Citrate | 10 |
| Zeolite | 10 |
| Sodium Sulfate | 15 |
| Enzymes | 2 |
| Optical brightening | 2 |
| Miscellaneous | To 100 |

[1]Tetraacetyl ethylene diamine

Compositions I through N are granular laundry detergents prepared by mixing the ingredients found in Table VIII:

TABLE VIII

|  | I | J | K | L | M | N |
|---|---|---|---|---|---|---|
| Linear alkylbenzene sulfonate with aliphatic carbon chain C$_{11-12}$ | 15 | 12 | 20 | 10 | 12 | 13 |
| Other surfactant | 1.6 | 1.2 | 1.9 | 3.2 | 0.5 | 1.2 |
| Phosphate builder(s) | 2 | 25 | 4 | 3 | 2 |  |
| Zeolite |  | 1 |  | 1 | 4 | 1 |
| Sodium carbonate | 9 | 20 | 10 | 17 | 5 | 23 |
| Polyacrylate (MW 4500) | 1 | 0.6 | 1 | 1 | 1.5 | 1 |
| Amphiphilic alkoxylated grease cleaning polymer[1] | 0.2 |  | 0.2 | 0.4 | 0.4 | 1.0 |
| Carboxymethyl cellulose (FinnFix BDA ex CPKelco) | 1 |  | 0.3 |  | 1.1 |  |
| Enzymes powders | 0.5 | 0.4 | 1.0 | 2.0 | 0.6 | 0.9 |
| Fluorescent Brightener(s) | 0.16 | 0.06 | 0.16 | 0.18 | 0.16 | 0.16 |
| Diethylene triamine pentaacetic acid or Ethylene diamine tetraacetic acid | 0.6 | 0.6 | 0.6 | 0.2h5 | 0.6 | 0.6 |
| MgSO$_4$ | 1 | 1 | 1 | 0.5 | 1 | 1 |
| Bleach(es) and Bleach activators | 6.9 |  | 6.1 | 2.1 | 1.2 | 4.7 |
| Sulfate/Moisture/Perfume | Balance to 100% | | | | | |

[1]Random graft copolymer is a polyvinyl acetate grafted polyethylene oxide copolymer having a polyethylene oxide backbone and multiple polyvinyl acetate side chains. The molecular weight of the polyethylene oxide backbone is about 6000 and the weight ratio of the polyethylene oxide to polyvinyl acetate is about 40 to 60 and no more than 1 grafting point per 50 ethylene oxide units.

Compositions O through T are liquid, single compartment (Q, R, S, and T) and liquid and solid, multicompartment (O,P) Fabric enhancers prepared by mixing the ingredients found in Table IX and Table X and sealing the liquid and solid compositions in separate compartments:

TABLE IX

|  | O | P | Q | R |
|---|---|---|---|---|
| DC346G (ex Dow-Corning) | 20.00 | 20.00 | 20.00 | 20.00 |
| AES | 1.16 | 1.16 | 1.16 | 1.16 |
| Neodol 23-9 | 5.00 | 5.00 | 5.00 | 5.00 |
| Guar Gum | 0.67 | 0.67 | 0.67 | 0.67 |
| Glycerin | 22.00 | 22.00 | 22.00 | 22.00 |
| Propylene Glycol | 11.00 | 11.00 | 11.00 | 11.00 |
| PEG 400 | 23.20 | 23.20 | 23.20 | 23.20 |
| Diutan gum | 1.00 | 1.00 | 1.00 | 1.00 |
| Dye | 0.20 | 0.20 | 0.20 | 0.20 |
| Perfume | 3.50 | 2.50 | 3.50 | 2.50 |
| Perfume Microcapsules | — | 1.25 | — | 1.25 |
| HCl | 0.13 | 0.13 | 0.13 | 0.13 |
| Adogen 443 | — | — | 0.25 | 0.25 |
| Water | Balance | Balance | Balance | Balance |
| Solid Composition | | | | |
| Distearylamine | 25.00 | 25.00 | — | — |
| Cumene sulfonic acid | 25.00 | 25.00 | — | — |
| Na Sulfate | 50.00 | 50.00 | — | — |

TABLE X

|  | S | T |
|---|---|---|
| Cationic Softener Active[1] | 65.0 | 65.0 |
| Fatty Acid[2] | 1.8 | 1.8 |
| TMPD[3] | 14.7 | 14.7 |
| Cocoamide 6EO[4] | 4.05 | 4.05 |
| Perfume | 5 | 2.5 |
| Perfume Microcapsules | — | 1.25 |

TABLE X-continued

|  | S | T |
|---|---|---|
| Dye | 0.001 | 0.001 |
| Hexylene Glycol[6] | 5.63 | 5.6 |
| Ethanol[6] | 5.63 | 5.6 |

[1]Di(acyloxyethyl)(2-hydroxy ethyl) methyl ammonium methyl sulfate wherein the acyl group is derived from partially hydrogenated canola fatty acid.

[2]Partially hydrogenated canola fatty acid.

[3]2,2,4-trimethyl-1,3-pentanediol

[4]PEG 6 cocamide - polyethylene glycol amide of coconut fatty acid.

[5]Sodium salt of hydroxyethane diphosphonic acid

[6]Material included with softening active by supplier.

III. Pouch

A single compartment pouch is made utilizing one or more of the films described in Table IV and one or more of the compositions A through N. The means of making the pouch is described in the METHODS section above.

A multi compartment pouch is made utilizing one or more of the films described in Table IV. The means of making the pouch is described in the METHODS section above. The following example "Pouch A" has three separate compartments each of which individually enclose one of the compositions 1-3, described in Table XI below:

TABLE XI

|  | Compartment Number | | |
|---|---|---|---|
|  | 1<br>32 g<br>Wt. % | 2<br>2.5 g<br>Wt. % | 3<br>2.5 g<br>Wt. % |
| Linear alkylbenzene sulfonic acid | 24.6 | 24.6 | 24.6 |
| C12-14 alkyl ethoxy-3-sulfate | 8.5 | 8.5 | 8.5 |
| C12-14 alkyl 7 ethoxylate | 20.1 | 20.1 | 20.1 |
| Citric acid | 0.5 | 0.5 | 0.5 |
| Protease enzyme | 1.5 | 1.5 | 1.5 |
| Amylase enzyme | 0.3 | 0.3 | 0.3 |
| Mannanase enzyme | 0.2 | 0.2 | 0.2 |
| Polyethyleneimine ethoxylate PEI600 E20 | 1.1 | 1.1 | 1.1 |
| Hydroxyethane diphosphonic acid (Dequest 2010) | 1.1 | 1.1 | 1.1 |
| Fluorescent brightening agents | 0.2 | 0.2 | 0.2 |
| 1,2 propane diol | 10.0 | 10.0 | 10.0 |
| Glycerol | 5.3 | 5.3 | 5.3 |
| Buffers (sodium hydroxide, monoethanolamine) | 10 | 10 | 10 |
| Sodium sulfite | 0.6 | 0.4 | 0.4 |
| Perfume | 1.7 | — | — |
| Dyes |  | 0.001 | 0.001 |
| Acusol 305, Rhom & Haas | 1.5 | — | — |
| Hydrogenated castor oil | 0.14 | 0.2 | 0.1 |
| Water |  | To 100% |  |

The following exemplary Pouches B, C and D are multi compartment pouches. Each is made utilizing one or more of the films described in Table IV. The means of making the pouch is described in the METHODS section above. Each of Pouches B, C and D have three separate compartments each of which individually enclose one of the liquid detergent compositions 1-3, described in Table XII below:

TABLE XII

|  | U<br>3 compartments | | | V<br>2 compartments<br>Compartment # | | W<br>3 compartments | | |
|---|---|---|---|---|---|---|---|---|
|  | 1 | 2 | 3 | 1 | 2 | 1 | 2 | 3 |
|  | Dosage (g) | | | | | | | |
|  | 34.0 | 3.5 | 3.5 | 30.0 | 5.0 | 25.0 | 1.5 | 4.0 |
|  | Weight % | | | | | | | |
| Alkylbenzene sulfonic acid | 20.0 | 20.0 | 20.0 | 10.0 | 20.0 | 20.0 |  |  |
| Alkyl sulfate |  |  |  | 2.0 |  |  |  |  |
| C12-14 alkyl 7-ethoxylate | 17.0 | 17.0 | 17.0 |  | 17.0 | 17.0 |  |  |
| Cationic surfactant |  |  |  | 1.0 |  |  |  |  |
| Zeolite A |  |  |  | 10.0 |  |  |  |  |
| C12-18 Fatty acid | 13.0 | 13.0 | 13.0 |  | 18.0 | 18.0 |  |  |
| Sodium acetate |  |  |  | 4.0 |  |  |  |  |
| enzymes | 0-3 | 0-3 | 0-3 | 0-3 |  | 0-3 |  |  |
| Sodium Percarbonate |  |  |  | 11.0 |  |  |  |  |
| TAED |  |  |  | 4.0 |  |  |  |  |
| Organic catalyst [1] |  |  |  | 1.0 |  |  |  |  |
| PAP granule [2] |  |  |  |  |  |  |  | 50 |
| Polycarboxylate |  |  |  | 1.0 |  |  |  |  |
| Ethoxysulfated Hexamethylene Diamine Dimethyl Quat | 2.2 | 2.2 | 2.2 |  |  |  |  |  |
| Hydroxyethane diphosphonic acid | 0.6 | 0.6 | 0.6 | 0.5 |  |  |  |  |
| Ethylene diamine tetra(methylene phosphonic) acid |  |  |  |  |  | 0.4 |  |  |
| Brightener | 0.2 | 0.2 | 0.2 | 0.3 |  | 0.3 |  |  |
| Mineral oil |  |  |  |  |  |  |  |  |
| Hueing dye [4] |  |  | 0.05 |  | 0.035 |  | 0.12 |  |
| Perfume | 1.7 | 1.7 |  | 0.6 |  | 1.5 |  |  |
| Water and minors (antioxidant, aesthetics, . . .) | 10.0 | 10.0 | 10.0 | 4.0 |  |  |  |  |

TABLE XII-continued

| | U 3 compartments | | | V 2 compartments | | W 3 compartments | | |
|---|---|---|---|---|---|---|---|---|
| | \multicolumn{8}{c}{Compartment #} |
| | 1 | 2 | 3 | 1 | 2 | 1 | 2 | 3 |
| | \multicolumn{8}{c}{Dosage (g)} |
| | 34.0 | 3.5 | 3.5 | 30.0 | 5.0 | 25.0 | 1.5 | 4.0 |
| | \multicolumn{8}{c}{Weight %} |
| Buffers (sodium carbonate, monoethanolamine) [5] | \multicolumn{8}{l}{To pH 8.0 for liquids To RA [5] >5.0% for powders} |
| Solvents (1,2 propanediol, ethanol) for liquids, Sodium Sulfate for powders | \multicolumn{8}{l}{To 100%} |

[1] Sulfuric acid mono-[2-(3,4-dihydro-isoquinolin-2-yl)-1-(2-ethyl-hexyloxymethyl)-ethyl]ester as described in U.S. Pat. No. 7,169,744
[2] PAP = Phtaloyl-Amino-Peroxycaproic acid, as a 70% active wet cake
[3] Polyethylenimine (MW = 600) with 20 ethoxylate groups per —NH.
[4] Ethoxylated thiophene, EO ($R_1 + R_2$) = 5
[5] RA = Reserve Alkalinity (e.g., >5 g NaOH equivalent/100 g dose)

The following examples are Dual compartment pouches comprising a liquid composition ($XL_i$) from Table XIII and its respective powder composition ($XP_i$) from Table XIV. Each pouch is made utilizing one or more of the films described in Table IV. The means of making the pouch is described in the METHODS section above.

TABLE XIII

| | Liquid Composition | | | |
|---|---|---|---|---|
| | XL1 10 g Wt % | XL2 5 g Wt % | XL3 15 g Wt % | XL4 7 g Wt % |
| Marlipal C24-7 | 74 | | 20 | 14 |
| Non ionic surfactant Neodol 23-5 | | 55 | | |
| Anionic surfactant[1] | | 20 | 20 | 25 |
| Propane diol | 10 | 4 | 22 | 10 |
| Glycerol | 2 | 5 | 5 | |
| Soil dispersant[2] | | 2 | | |
| Amphiphilic alkoxylated grease cleaning polymer[3] | | | 5 | |
| Fatty acid | | | 10 | 20 |
| Enzymes | | | | 3 |
| Structurant | | | 3 | |
| Perfume | 7 | 10 | | |
| Water | 2 | 3 | 5 | |
| Monoethanol amine | | | To pH 7.5 | |
| Minors | | | To 100% | |

[1] Linear $C_{11-13}$ alkyl benzene sulfonic acid
[2] $(Bis(C_2H_5O)(C_2H_4O)_n)(CH_3)-N^+-C_xH_{2x}-N^+-(CH_3)-bis((C_2H_5O)(C_2H_4O)_n)$, wherein n = from 15 to 30, and x = from 3 to 8.
3Random graft copolymer is a polyvinyl acetate grafted polyethylene oxide copolymer having a polyethylene oxide backbone and multiple polyvinyl acetate side chains. The molecular weight of the polyethylene oxide backbone is about 6000 and the weight ratio of the polyethylene oxide to polyvinyl acetate is about 40 to 60 and no more than 1 grafting point per 50 ethylene oxide units.

TABLE XIV

| | Powder Composition | | | |
|---|---|---|---|---|
| | XP1 35 g Wt % | XP2 25 g Wt % | XP3 40 g Wt % | XP4 30 g Wt % |
| Anionic surfactant | | 20 | 20 | 20 |
| Cationic surfactant | | | 1.5 | 1.5 |
| Bleach agent | 20 | 36 | 36 | 36 |
| Chelating agent | 0.8 | 2 | 2 | 2 |
| Enzyme | | 10 | 10 | 10 |
| Sodium carbonate | | 6 | 4 | 4 |
| Sodium bicarbonate | | | 4 | 4 |
| Zeolite | 40 | 20 | 15 | 15 |
| Fluorescent whitening agent | 0.5 | 3 | | 1 |
| Polymers | 2 | | 5 | 5 |
| Sodium sulfate | 15 | | | |
| Minors | \multicolumn{4}{c}{To 100%} |

Data

Data are collected for films (10 samples per film) according to the present disclosure and commercially available films. Each film is tested as a fresh film and as an aged film. Indices are determined using the following equations (1) and (2) utilizing the data:

$$\text{Dissolution Index} = 7 \times (\text{Aged Dissolution Time}) + (\text{Aged Burst Strength}) \quad (1)$$

$$\text{Stress Index} = (\text{Stress@100\% Elongation}) \times (\text{Ultimate Tensile Strength}) \quad (2)$$

| Film | Thickness (microns) | Dissolution Time (s) Fresh Film | Dissolution Time (s) Aged Film | Burst Strength (s) Fresh | Burst Strength (s) Aged | Stress @ 100% Elongation (MPa) | Ultimate Tensile Strength (MPa) | Dissolution Index (s)[1] | Stress Index $(MPa^2)$[2] |
|---|---|---|---|---|---|---|---|---|---|
| M8630[1] | 76 | 72 | 128 | 24 | 34 | 7.2 | 26.7 | 930 | 192.2 |
| M8900[2] | 76 | 52 | 84 | 28 | 24 | 8.2 | 25.1 | 612 | 205.8 |
| Sample A[3] | 76 | 123 | 145 | 64 | 46 | 15.2 | 41.5 | 1061 | 630.8 |
| Sample B[4] | 76 | 144 | 137 | 46 | 43 | 11.7 | 35.0 | 1002 | 409.5 |
| Sample C1 | 76 | 85 | 98 | 27 | 30 | 5.2 | 27.4 | 716 | 142.5 |
| Sample 1 | 76 | 94 | 109 | 36 | 33 | 7.0 | 34.8 | 796 | 243.6 |
| Sample 2 | 76 | 82 | 106 | 29 | 37 | 6.1 | 32.8 | 779 | 200.1 |

-continued

| | | Dissolution Time (s) | | Burst Strength (s) | | Stress @ 100% | | | Stress |
| | Thickness | Fresh | Aged | | | Elongation | Ultimate Tensile | Dissolution | Index |
| Film | (microns) | Film | Film | Fresh | Aged | (MPa) | Strength (MPa) | Index (s)[1] | (MPa^2)[2] |
| --- | --- | --- | --- | --- | --- | --- | --- | --- | --- |
| Sample 3 | 76 | 76 | 108 | 25 | 37 | 5.6 | 30.2 | 793 | 169.1 |
| Sample 4 | 76 | 93 | 125 | 45 | 44 | 6.1 | 29.0 | 919 | 176.9 |

[1]M8630 is a PVOH copolymer film available from MONOSOL. LLC, Merrillville, IN (USA)
[2]M8900 is a PVOH copolymer film available from MONOSOL. LLC, Merrillville, IN (USA)
[3]Sample A is a PVOH copolymer film comprising a PVOH polymer having a nominal viscosity of 23 cP and a nominal degree of hydrolysis of 88 as 100% of the PVOH resin content.
[4]Sample B is a PVOH copolymer film comprising a ratio of two parts by weight of a PVOH polymer having a nominal viscosity of 26 cP and a nominal degree of hydrolysis of 88 to one part by weight PVOH polymer having a nominal viscosity of 15 cP and a nominal degree of hydrolysis of 79, the three parts forming 100% of the PVOH resin content in the film.

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

Aspects of the Disclosure:

A first aspect of the present disclosure is a water-soluble film having any suitable thickness, the water-soluble film comprising a total of at least 50 wt. % of PVOH polymer in the form of a resin, the film comprising a water-soluble polyvinyl alcohol (PVOH) resin, such that when the film has a thickness of about 76 microns the film is characterized by (a) a Dissolution Index of about 620 to about 920, or of about 665 to about 920, or about 710 to about 920; and (b) a Stress Index of about 145 to about 626, or about 155 to about 480, or about 165 to about 325, the resin further having a viscosity average of at least about 13.5 cP, 14 cP, 15 cP, 16 cP, or 17 cP and at most about 20 cP, 19 cP, 18 cP, 17.5 cP as a 4 wt. % aqueous solution at 20° C., for example in a range of about 13.5 cP to about 20 cP, or about 14 cP to about 19 cP, or about 16 cP to about 18 cP, or about 17 cP to about 17.5 cP;

and a degree of hydrolysis of at least 84% or 85% and at most about 92%, 90%, 89%, 88%, or 87%, for example in a range of about 84% to about 90%, or 85% to 88%, or 86.5%;

the resin further having no more than 30 wt. % of a PVOH polymer having an average viscosity less than about 11 cP and a polydispersity index in a range of about 1.8 to about 2.3.

In any one of the embodiments of the first aspect, the resin can comprise at least two PVOH polymers, the first PVOH polymer having a viscosity of at least about 8 cP, 10 cP, 12 cP, or 13 cP and at most about 40 cP, 20 cP, 15 cP, or 13 cP, for example in a range of about 8 cP to about 40 cP, or about 10 cP to about 20 cP, or about 10 cP to about 15 cP, or about 12 cP to about 14 cP, or 13 cP; and the second PVOH polymer having a viscosity of at least about 10 cP, 20 cP, or 22 cP and at most about 40 cP, 30 cP, 25 cP, or 24 cP, for example in a range of about 10 cP to about 40 cP, or 20 cP to about 30 cP, or about 20 to about 25 cP, or about 22 to about 24, or about 23 cP;

the viscosity of the first PVOH polymer being less than the viscosity of the second PVOH polymer.

In any one of the embodiments of the first aspect, the resin can comprise a first PVOH polymer that has a polydispersity index (PDI) value in a range of about 1 to about 5; and a second PVOH polymer that has a PDI value in a range of about 1 to about 5; and each PVOH polymer can have a PDI value in a range of about 1.5 to about 3; or about 1.7 to about 2.2.

In any one of the embodiments of the first aspect, the resin can comprise about 10, 15, 20, 25, 30, 35, 40, 45, 50, 55, 60, 65, 70, 75, 80, 85, 90 wt. % of the first PVOH polymer, and about 10, 15, 20, 25, 30, 35, 40, 45, 50, 55, 60, 65, 70, 75, 80, 85, 90 wt. % of the second PVOH polymer, for example about 30 to about 85 wt. % of the first PVOH polymer, or about 45 to about 55 wt. % of the first PVOH polymer.

In any one of the embodiments of the first aspect, the total PVOH resin can have a PDI value greater than about 2, 2.2, 2.4, 2.6, 2.8, 3.0, 3.2, 3.4, 3.6, 3.8, 4.0, 4.2, 4.4, 4.6, 4.8, or 5.0; for example, the PDI value of the total resin can be greater than the PDI value of any individual PVOH polymer included in the resin.

In any one of the embodiments of the first aspect, the first PVOH polymer can have a weight average molecular weight ($\overline{M}W$) in a range of about 50,000 to about 300,000 Daltons, or about 60,000 to about 150,000 Daltons; and the second PVOH polymer can have a $\overline{M}w$ in a range of about 60,000 to about 300,000 Daltons, or about 80,000 to about 250,000 Daltons; optionally the second PVOH polymer can have a $\overline{M}w$ greater than the first PVOH polymer; and further optionally the resin can have no more than about 30 wt. % of a PVOH polymer having a $\overline{M}w$ less than about 70,000 Daltons.

In any one of the embodiments of the first aspect, the film further can include a plasticizer.

In any one of the embodiments of the first aspect, the film can have a residual moisture content of at least 4 wt. %, for example in a range of about 4 to about 10 wt. %.

In any one of the embodiments of the first aspect, the film can be characterized by a Burst Strength Test value of greater than about 20 seconds (s), preferably greater than 30 s, and more preferably greater than 40 s.

In any one of the embodiments of the first aspect, the film can be characterized by a wash-residue value of at most about 4.5, 4.0, 3.5, 3.0, 2.9, or 2.8, preferably at most about 2.7, 2.6, 2.5, 2.4, 2.3, 2.2, 2.1, or 2.0.

In any one of the embodiments of the first aspect, the film can be thermoformable.

In any one of the embodiments of the first aspect, the Resin Selection Index value can be in a range of 0.255 to 0.315, or 0.260 to 0.310, or 0.265 to 0.305, or 0.270 to 0.300, or 0.275 to 0.295, preferably 0.270 to 0.300.

A second aspect of the present disclosure is a water-soluble film having any suitable thickness, the water-soluble film comprising about 4 to about 10 wt. % water and a total of at least 50 wt. % of PVOH polymer in the form of a resin such that when the film has a thickness of about 76 microns the film is characterized by: (a) a Dissolution Index of about 620 to about 920, or of about 665 to about 920, or about 710 to about 920; and (b) a Stress Index of about 145 to about 626, or about 155 to about 480, or about 165 to about 325.

the resin further comprising a blend of a first and a second PVOH polymer, the first PVOH polymer having a viscosity of at least 8 cP or 10 cP and at most 40 cP, 20 cP, or 15 cP, for example in a range of about 8 cP to about 40 cP, or about 10 cP to about 20 cP, or about 10 cP to about 15 cP; and the second PVOH polymer having a viscosity of at least 10 cP or 20 cP and at most 40 cP, 30 cP, or 25 cP, for example in a range of about 10 cP to about 40 cP, or about 20 cP to about 30 cP, or about 20 cP to about 25 cP;

the viscosity of the first PVOH polymer being less than the viscosity of the second PVOH polymer, and the resin having no more than 30 wt. % of a PVOH polymer having an average viscosity less than about 11 cP and a polydispersity index in a range of about 1.8 to about 2.3.

In any one of the embodiments of the second aspect, the resin can optionally have a viscosity average in a range of about 13.5 cP to about 20 cP, and further optionally a degree of hydrolysis of at least 84% or 85% and at most about 92%, 90%, 89%, 88%, or 87%, for example in a range of about 84% to about 90%, or 85% to 88%, or 86.5%.

In any one of the embodiments of the second aspect, the resin can comprise a first PVOH polymer that has a polydispersity index (PDI) value in a range of about 1 to about 5; and a second PVOH polymer that has a PDI value in a range of about 1 to about 5; and each PVOH polymer can have a PDI value in a range of about 1.5 to about 3; or about 1.7 to about 2.2.

In any one of the embodiments of the second aspect, the resin can comprise about 10, 15, 20, 25, 30, 35, 40, 45, 50, 55, 60, 65, 70, 75, 80, 85, 90 wt. % of the first PVOH polymer, and about 10, 15, 20, 25, 30, 35, 40, 45, 50, 55, 60, 65, 70, 75, 80, 85, 90 wt. % of the second PVOH polymer, for example about 30 wt. % to about 85 wt. % or about 45 wt. % to about 55 wt. % of the first PVOH polymer.

In any one of the embodiments of the second aspect, the total PVOH resin can have a PDI value greater than about 2, 2.2, 2.4, 2.6, 2.8, 3.0, 3.2, 3.4, 3.6, 3.8, 4.0, 4.2, 4.4, 4.6, 4.8, or 5.0; for example, the PDI value of the total resin can be greater than the PDI value of any individual PVOH polymer included in the resin.

In any one of the embodiments of the second aspect, the first PVOH polymer can have a weight average molecular weight ($\overline{M}w$) in a range of about 50,000 to about 300,000 Daltons, or about 60,000 to about 150,000 Daltons; and the second PVOH polymer can have a $\overline{M}w$ in a range of about 60,000 to about 300,000 Daltons, or about 80,000 to about 250,000 Daltons; the second polyol polymer having a $\overline{M}w$ greater than the first polyol polymer; and, optionally, the resin having no more than about 30 wt. % of a PVOH polymer having a $\overline{M}w$ less than about 70,000 Daltons.

In any one of the embodiments of the second aspect, the film can be characterized by a Burst Strength Test value of greater than about 20 seconds (s), preferably greater than 30 s, and more preferably greater than 40 s.

In any one of the embodiments of the second aspect, the film can be characterized by a wash-residue value of at most about 4.5, 4.0, 3.5, 3.0, 2.9, or 2.8, preferably at most about 2.7, 2.6, 2.5, 2.4, 2.3, 2.2, 2.1, or 2.0.

In any one of the embodiments of the second aspect, the film further can include a plasticizer.

In any one of the embodiments of the second aspect, the film can be thermoformable.

In any one of the embodiments of the second aspect, the Resin Selection Index value can be in a range of 0.255 to 0.315, or 0.260 to 0.310, or 0.265 to 0.305, or 0.270 to 0.300, or 0.275 to 0.295, preferably 0.270 to 0.300.

A third aspect of the present disclosure is a water-soluble film having any suitable thickness and comprising about 4 to about 10 wt. % water, a total of at least 50 wt. % of PVOH polymer in the form of a resin, and optionally a plasticizer, such that when the film has a thickness of about 76 microns the film is characterized by: (a) a Dissolution Index of about 620 to about 920, or of about 665 to about 920, or about 710 to about 920; and (b) a Stress Index of about 145 to about 626, or about 155 to about 480, or about 165 to about 325.

the resin further having a ($\overline{M}w$) in a range of about 50,000 to about 300,000 Daltons and a degree of hydrolysis in a range of about 84% to about 90%, or about 85% to about 88%;

the resin further having no more than 30 wt. % of a PVOH polymer having a $\overline{M}w$ less than about 70,000 Daltons.

In any one of the embodiments of the third aspect, the resin can optionally have a viscosity average in a range of about 13.5 cP to about 20 cP; and further optionally the resin can have no more than 30 wt. % of a PVOH polymer having an average viscosity less than about 11 cP and a polydispersity index in a range of about 1.8 to about 2.3.

In any one of the embodiments of the third aspect, the resin can comprise at least two PVOH polymers, the first PVOH polymer having a viscosity of at least about 8 cP, 10 cP, 12 cP, or 13 cP and at most about 40 cP, 20 cP, 15 cP, or 13 cP, for example in a range of about 8 cP to about 40 cP, or about 10 cP to about 20 cP, or about 10 cP to about 15 cP, or about 12 cP to about 14 cP, or 13 cP; and the second PVOH polymer having a viscosity of at least about 10 cP, 20 cP, or 22 cP and at most about 40 cP, 30 cP, 25 cP, or 24 cP, for example in a range of about 10 cP to about 40 cP, or 20 to about 30 cP, or about 20 to about 25 cP, or about 22 to about 24, or about 23 cP;

the viscosity of the first PVOH polymer being less than the viscosity of the second PVOH polymer.

In any one of the embodiments of the third aspect, the resin can comprise a first PVOH polymer that has a polydispersity index (PDI) value in a range of about 1 to about 5; and a second PVOH polymer that has a PDI value in a range of about 1 to about 5; and each PVOH polymer can have a PDI value in a range of about 1.5 to about 3; or about 1.7 to about 2.2.

In any one of the embodiments of the third aspect, the resin can comprise about 10, 15, 20, 25, 30, 35, 40, 45, 50, 55, 60, 65, 70, 75, 80, 85, 90 wt. % of the first PVOH polymer, and about 10, 15, 20, 25, 30, 35, 40, 45, 50, 55, 60, 65, 70, 75, 80, 85, 90 wt. % of the second PVOH polymer, for example about 30 to about 85 wt. % of the first PVOH polymer, or about 45 to about 55 wt. % of the first PVOH polymer.

In any one of the embodiments of the third aspect, the total PVOH resin can have a PDI value greater than about 2, 2.2, 2.4, 2.6, 2.8, 3.0, 3.2, 3.4, 3.6, 3.8, 4.0, 4.2, 4.4, 4.6, 4.8, or 5.0; for example, the PDI value of the total resin can be greater than the PDI value of any individual PVOH polymer included in the resin.

In any one of the embodiments of the third aspect, the film can be characterized by a Burst Strength Test value of greater than about 20 seconds (s), preferably greater than 30 s, and more preferably greater than 40 s.

In any one of the embodiments of the third aspect, the film can be characterized by a wash-residue value of at most about 4.5, 4.0, 3.5, 3.0, 2.9, or 2.8, preferably at most about 2.7, 2.6, 2.5, 2.4, 2.3, 2.2, 2.1, or 2.0.

In any one of the embodiments of the third aspect, the film can be thermoformable.

In any one of the embodiments of the third aspect, the Resin Selection Index value can be in a range of 0.255 to 0.315, or 0.260 to 0.310, or 0.265 to 0.305, or 0.270 to 0.300, or 0.275 to 0.295, preferably 0.270 to 0.300.

A fourth aspect of the present disclosure is a water-soluble film having any suitable thickness, the water-soluble film comprising a total of at least 50 wt. % of PVOH polymer in the form of a resin having a Resin Selection Index value of 0.270 to 0.300 such that when the film has a thickness of about 76 microns the film is characterized by: (a) a Dissolution Index of about 620 to about 920, or of about 665 to about 920, or about 710 to about 920; and (b) a Stress Index of about 145 to about 626, or about 155 to about 480, or about 165 to about 325.

In any one of the embodiments of the fourth aspect, the resin can optionally have a viscosity average in a range of about 13.5 cP to about 20 cP, and further optionally a degree of hydrolysis of at least 84% or 85% and at most about 92%, 90%, 89%, 88%, or 87%, for example in a range of about 84% to about 90%, or 85% to 88%, or 86.5%.

In any one of the embodiments of the fourth aspect, the resin can comprise at least two PVOH polymers,
the first PVOH polymer having a viscosity of at least about 8 cP, 10 cP, 12 cP, or 13 cP and at most about 40 cP, 20 cP, 15 cP, or 13 cP, for example in a range of about 8 cP to about 40 cP, or about 10 cP to about 20 cP, or about 10 cP to about 15 cP, or about 12 cP to about 14 cP, or 13 cP; and
the second PVOH polymer having a viscosity of at least about 10 cP, 20 cP, or 22 cP and at most about 40 cP, 30 cP, 25 cP, or 24 cP, for example in a range of about 10 cP to about 40 cP, or 20 to about 30 cP, or about 20 to about 25 cP, or about 22 to about 24, or about 23 cP;
the viscosity of the first PVOH polymer being less than the viscosity of the second PVOH polymer.

In any one of the embodiments of the fourth aspect, the resin can comprise a first PVOH polymer that has a polydispersity index (PDI) value in a range of about 1 to about 5; and a second PVOH polymer that has a PDI value in a range of about 1 to about 5; and each PVOH polymer can have a PDI value in a range of about 1.5 to about 3; or about 1.7 to about 2.2.

In any one of the embodiments of the fourth aspect, the resin can comprise about 10, 15, 20, 25, 30, 35, 40, 45, 50, 55, 60, 65, 70, 75, 80, 85, 90 wt. % of the first PVOH polymer, and about 10, 15, 20, 25, 30, 35, 40, 45, 50, 55, 60, 65, 70, 75, 80, 85, 90 wt. % of the second PVOH polymer, for example about 30 to about 85 wt. % of the first PVOH polymer, or about 45 to about 55 wt. % of the first PVOH polymer.

In any one of the embodiments of the fourth aspect, the total PVOH resin can have a PDI value greater than about 2, 2.2, 2.4, 2.6, 2.8, 3.0, 3.2, 3.4, 3.6, 3.8, 4.0, 4.2, 4.4, 4.6, 4.8, or 5.0; for example, the PDI value of the total resin can be greater than the PDI value of any individual PVOH polymer included in the resin.

In any one of the embodiments of the fourth aspect, the first PVOH polymer can have a weight average molecular weight ($\overline{M}w$) in a range of about 50,000 to about 300,000 Daltons, or about 60,000 to about 150,000 Daltons; and the second PVOH polymer can have a $\overline{M}w$ in a range of about 60,000 to about 300,000 Daltons, or about 80,000 to about 250,000 Daltons; the second polyol polymer having a $\overline{M}w$ greater than the first polyol polymer; and, optionally, the resin having no more than about 30 wt. % of a PVOH polymer having a $\overline{M}w$ less than about 70,000 Daltons.

In any one of the embodiments of the fourth aspect, the film further can include a plasticizer.

In any one of the embodiments of the fourth aspect, the film can have a residual moisture content of about 4 to about 10 wt. %.

In any one of the embodiments of the fourth aspect, the film can be characterized by a Burst Strength Test value of greater than about 20 seconds (s), preferably greater than 30 s, and more preferably greater than 40 s.

In any one of the embodiments of the fourth aspect, the film can be characterized by a wash-residue value of at most about 4.5, 4.0, 3.5, 3.0, 2.9, or 2.8, preferably at most about 2.7, 2.6, 2.5, 2.4, 2.3, 2.2, 2.1, or 2.0.

In any one of the embodiments of the fourth aspect, the film can be thermoformable.

A fifth aspect of the present disclosure is a method of making a water-soluble film having any suitable thickness, the water-soluble film comprising about 4 to about 10 wt. % water, a total of at least 50 wt. % of PVOH polymer in the form of a resin, and optionally a plasticizer, such that when the film has a thickness of about 76 microns the film is characterized by: (a) a Dissolution Index of about 620 to about 920, or of about 665 to about 920, or about 710 to about 920; and (b) a Stress Index of about 145 to about 626, or about 155 to about 480, or about 165 to about 325
the method including forming a film from a PVOH resin having a viscosity average in a range of about 13.5 cP to about 20 cP and a degree of hydrolysis of at least 84% or 85% and at most about 92%, 90%, 89%, 88%, or 87%, for example in a range of about 84% to about 90%, or 85% to 88%, or 86.5%; the resin further having no more than 30 wt. % of a PVOH polymer having an average viscosity less than about 11 cP and a polydispersity index in a range of about 1.8 to about 2.3.

In any one of the embodiments of the fifth aspect, the resin can comprise at least two PVOH polymers,
the first PVOH polymer having a viscosity of at least about 8 cP, 10 cP, 12 cP, or 13 cP and at most about 40 cP, 20 cP, 15 cP, or 13 cP, for example in a range of about 8 cP to about 40 cP, or about 10 cP to about 20 cP, or about 10 cP to about 15 cP, or about 12 cP to about 14 cP, or 13 cP; and
the second PVOH polymer having a viscosity of at least about 10 cP, 20 cP, or 22 cP and at most about 40 cP, 30 cP, 25 cP, or 24 cP, for example in a range of about 10 cP to about 40 cP, or 20 to about 30 cP, or about 20 to about 25 cP, or about 22 to about 24, or about 23 cP;
the viscosity of the first PVOH polymer being less than the viscosity of the second PVOH polymer.

In any one of the embodiments of the fifth aspect, the method can include admixing, cocasting, or welding a first PVOH polymer and a second PVOH polymer to form the PVOH resin.

In any one of the embodiments of the fifth aspect, the resin can comprise a first PVOH polymer that has a polydispersity index (PDI) value in a range of about 1 to about 5; and a second PVOH polymer that has a PDI value in a range of about 1 to about 5; and each PVOH polymer can have a PDI value in a range of about 1.5 to about 3; or about 1.7 to about 2.2.

In any one of the embodiments of the fifth aspect, the resin can comprise about 10, 15, 20, 25, 30, 35, 40, 45, 50, 55, 60, 65, 70, 75, 80, 85, 90 wt. % of the first PVOH polymer, and about 10, 15, 20, 25, 30, 35, 40, 45, 50, 55, 60, 65, 70, 75, 80, 85, 90 wt. % of the second PVOH polymer, for example about 30 to about 85 wt. % of the first PVOH polymer, or about 45 to about 55 wt. % of the first PVOH polymer.

In any one of the embodiments of the fifth aspect, the total PVOH resin can have a PDI value greater than about 2, 2.2, 2.4, 2.6, 2.8, 3.0, 3.2, 3.4, 3.6, 3.8, 4.0, 4.2, 4.4, 4.6, 4.8, or 5.0; for example, the PDI value of the total resin can be greater than the PDI value of any individual PVOH polymer included in the resin.

In any one of the embodiments of the fifth aspect, the first PVOH polymer can have a weight average molecular weight ($\overline{M}w$) in a range of about 50,000 to about 300,000 Daltons, or about 60,000 to about 150,000 Daltons; and the second PVOH polymer can have a $\overline{M}w$ in a range of about 60,000 to about 300,000 Daltons, or about 80,000 to about 250,000 Daltons; the second polyol polymer having a $\overline{M}w$ greater than the first polyol polymer; and, optionally, the resin having no more than about 30 wt. % of a PVOH polymer having a $\overline{M}w$ less than about 70,000 Daltons.

In any one of the embodiments of the fifth aspect, the film can be characterized by a Burst Strength Test value of greater than about 20 seconds (s), preferably greater than 30 s, and more preferably greater than 40 s.

In any one of the embodiments of the fifth aspect, the film can be characterized by a wash-residue value of at most about 4.5, 4.0, 3.5, 3.0, 2.9, or 2.8, preferably at most about 2.7, 2.6, 2.5, 2.4, 2.3, 2.2, 2.1, or 2.0.

In any one of the embodiments of the fifth aspect, the film can be thermoformable.

In any one of the embodiments of the fifth aspect, the Resin Selection Index value can be in a range of 0.255 to 0.315, or 0.260 to 0.310, or 0.265 to 0.305, or 0.270 to 0.300, or 0.275 to 0.295, preferably 0.270 to 0.300.

A sixth aspect of the present disclosure is a sealable pouch or a packet that comprises a PVOH film as described herein.

In any one of the embodiments of the sixth aspect, the PVOH film is disposed as an outer wall of the pouch or packet.

In any one of the embodiments of the sixth aspect, the pouch or packet can comprise a single compartment or a plurality of compartments, optionally with the outer walls of the entire pouch or packet comprising a PVOH film according to the disclosure, and further optionally with at least one inner wall also comprising a PVOH film according to the disclosure. The PVOH film or films forming the one or more outer walls of the pouch or packet can be the same as or different from the film or films forming one or more inner walls of a multicompartment pouch or packet, and optionally are the same.

In any one of the embodiments of the sixth aspect, the Resin Selection Index value can be in a range of 0.255 to 0.315, or 0.260 to 0.310, or 0.265 to 0.305, or 0.270 to 0.300, or 0.275 to 0.295, preferably 0.270 to 0.300.

A seventh aspect of the present disclosure is a water-soluble film having any suitable thickness, the water-soluble film comprising at least 50 wt. % of a PVOH resin such that when the film has a thickness of about 76 microns the film is characterized by: (a) a Dissolution Index of about 620 to about 920, or of about 665 to about 920, or about 710 to about 920; and (b) a Stress Index of about 145 to about 626, or about 155 to about 480, or about 165 to about 325.

An eighth aspect of the present disclosure is a pouch comprising a PVOH film as described herein, for example in any one or more of the first through seventh aspects. The pouch comprises at least one sealed compartment containing a first composition, wherein at least one wall of the at least one sealed compartment is made from a PVOH film as described herein having any suitable thickness.

In some embodiments according to the eighth aspect of the present disclosure, one or more of the following may be true: at least one wall of the pouch is disposed as an outer wall of the pouch; at least one wall is in contact with the first composition; the first composition is selected from the group of a liquid, a solid and mixtures thereof; and/or the first composition comprises by weight percentage about 1% to about 65% of total anionic surfactant.

In some embodiments according to the eighth aspect of the present disclosure the pouch further comprises a second sealed compartment containing a second composition, wherein the second sealed compartment is in a generally superposed relationship with the first sealed compartment such that the second sealed compartment and the first sealed compartment share a partitioning wall interior to the pouch. The second composition is selected from a liquid, a solid and mixtures thereof.

In some embodiments according to the eighth aspect of the present disclosure, the pouch further comprises a third sealed compartment containing a third composition, wherein the third sealed compartment is in a generally superposed relationship with the first sealed compartment such that the third sealed compartment and the first sealed compartment share a partitioning wall interior to the pouch. The third composition of the pouch is selected from a liquid, a solid and mixtures thereof.

In some embodiments according to the eighth aspect, the first composition and the second composition are selected from one of the following combinations: liquid, liquid; liquid, powder; powder, powder; and powder, liquid.

In some embodiments according to the eighth aspect, the first, second and third compositions are selected from one of the following combinations: solid, liquid, liquid and liquid, liquid, liquid.

A ninth aspect of the present disclosure is a multi-compartment pouch comprising at least a first sealed compartment containing a first composition, and a second sealed compartment containing a second composition, in which the second sealed compartment is in a generally superposed relationship with the first sealed compartment such that the second sealed compartment and the first sealed compartment share a partitioning wall interior to the pouch; and at least one wall of each of the first and the second sealed compartments is made from a PVOH film as described herein, for example in any one or more of the first through seventh aspects.

In some embodiments according to the ninth aspect, the first composition and the second composition are selected from one of the following combinations: liquid, liquid; liquid, powder; powder, powder; and powder, liquid.

In any of the eighth, ninth or tenth aspects of the present disclosure, the composition is selected from the group of: liquid light duty and liquid heavy duty liquid detergent compositions, powdered detergent compositions, dish detergent for hand washing and/or machine washing; hard surface cleaning compositions, fabric enhancers, detergent gels commonly used for laundry, and bleach and laundry additives, shampoos, and body washes.

While particular embodiments of the present disclosure have been illustrated and described, it would be obvious to those skilled in the art that various other changes and modifications can be made without departing from the spirit and scope of the invention. It is therefore intended to cover in the appended claims all such changes and modifications that are within the scope of this invention.

The invention claimed is:

1. A water-soluble film having any suitable thickness, the water-soluble film comprising:
   at least 50 wt. % of a water-soluble polyvinyl alcohol (PVOH) resin, the PVOH resin having an average viscosity in a range of about 13.5 cP to about 20 cP and a degree of hydrolysis in a range of about 84% to about 92%; and
   the film further having no more than 30 wt. % of a PVOH polymer having an average viscosity less than about 11 cP;
   the film further characterized by having a Dissolution Index in a range of about 620 to about 920 and a Stress Index in a range of about 145 to about 626 when the film has a thickness of about 76 microns,
   wherein the film is thermoformable.

2. The water-soluble film of claim 1, wherein the PVOH resin comprises a first PVOH polymer having a viscosity in a range of about 8 cP to about 40 cP and a second PVOH polymer having a viscosity in a range of about 10 cP to about 40 cP, wherein the viscosity of the first PVOH polymer is less than the viscosity of the second PVOH polymer.

3. The water-soluble film of claim 2, wherein the first PVOH polymer has a viscosity in a range of about 10 cP to about 20 cP.

4. The water-soluble film of claim 3, wherein the first PVOH polymer has a viscosity in a range of about 10 cP to about 15 cP.

5. The water-soluble film of claim 2, wherein the second PVOH polymer has a viscosity in a range of about 20 cP to about 30 cP.

6. The water-soluble film of claim 5, wherein the second PVOH polymer has a viscosity in a range of about 20 cP to about 25 cP.

7. The water-soluble film of claim 1 further comprising about 1 wt. % to about 40 wt. % of a plasticizer.

8. The water-soluble film of claim 7, wherein the plasticizer comprises a material selected from the group consisting of glycerin, sorbitol, propylene glycol, 2-methyl-1,3-propanediol, and a mixture thereof.

9. The water-soluble film of claim 7, wherein the film comprises about 15 wt. % to about 35 wt. % of the plasticizer.

10. The water-soluble film of claim 1 further comprising a residual moisture content in a range of about 4 wt. % to about 10 wt. %.

11. The water-soluble film of claim 1, wherein the Dissolution Index is in a range about 665 to about 920.

12. The water-soluble film of claim 11, wherein the Dissolution Index is in a range of about 710 to about 920.

13. The water-soluble film of claim 1, wherein the Stress Index is in a range of about 155 to about 480.

14. The water-soluble film of claim 13, wherein the Stress Index is in a range of about 165 to about 325.

15. The water-soluble film of claim 1 further characterized by a Burst Strength Test value of greater than about 20 seconds when the film has a thickness of about 76 microns.

16. The water-soluble film of claim 15, wherein the Burst Strength Test value is greater than about 30 seconds.

17. The water-soluble film of claim 1, wherein the resin is characterized by a Resin Selection Index value in a range of 0.255 to 0.315.

18. A water-soluble film comprising:
   at least 50 wt. % of a PVOH resin, the resin having an average viscosity in a range of about 13.5 cP to about 20 cP and a degree of hydrolysis in a range of about 84% to about 90%; the resin comprising a blend of first and second PVOH polymers, the first PVOH polymer having a viscosity in a range of about 8 cP to about 40 cP, the second PVOH polymer having a viscosity in a range of about 10 cP to about 40 cP, and the viscosity of the first PVOH polymer being less than the viscosity of the second PVOH polymer;
   about 10 wt. % to about 40 wt. % of a plasticizer;
   a residual moisture content of at least 4 wt. %; and
   the film further having no more than 30 wt. % of a PVOH polymer having an average viscosity less than about 11 cP;
   the film further characterized by a Dissolution Index of about 620 to about 920 and a Stress Index of about 145 to about 626 when the film has a thickness of about 76 microns.

19. The water-soluble film of claim 18, wherein the residual moisture content is in a range of about 4 wt. % to about 10 wt. %.

20. A water-soluble film comprising:
   at least 50 wt. % of a PVOH resin characterized by a Resin Selection Index value in a range of 0.255 to 0.315, the resin comprising a blend of first and second PVOH polymers, the first PVOH polymer having a viscosity in a range of about 8 cP to about 40 cP, the second PVOH polymer having a viscosity in a range of about 10 cP to about 40 cP, and the viscosity of the first PVOH polymer being less than the viscosity of the second PVOH polymer;
   about 10 wt. % to about 40 wt. % of a plasticizer; and
   the film further having no more than 30 wt. % of a PVOH polymer having an average viscosity less than about 11 cP;
   the film further characterized by a Dissolution Index of about 620 to about 920 and a Stress Index of about 145 to about 626 when the film has a thickness of about 76 microns.

21. The water-soluble film of claim 20, wherein the Resin Selection Index value is in a range of 0.260 to 0.310.

22. The water-soluble film of claim 21, wherein the Resin Selection Index value is in a range of 0.265 to 0.305.

23. The water-soluble film of claim 22, wherein the Resin Selection Index value is in a range of 0.270 to 0.300.

24. A pouch comprising the water-soluble film of claim 1.

25. The pouch of claim 24 comprising two or more compartments.

* * * * *